United States Patent
Wendte et al.

(10) Patent No.: US 9,936,625 B2
(45) Date of Patent: Apr. 10, 2018

(54) MULTIPLE SEED-TYPE PLANTING SYSTEM WITH SEED DELIVERY SPEED CONTROL

(71) Applicant: CNH Industrial America LLC, New Holland, PA (US)

(72) Inventors: Keith W. Wendte, Willowbrook, IL (US); Monte Gene Weller, Fankfort, IL (US); Brian T. Adams, Contralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 66 days.

(21) Appl. No.: 14/691,007

(22) Filed: Apr. 20, 2015

(65) Prior Publication Data

US 2016/0302353 A1    Oct. 20, 2016

(51) Int. Cl.
| | | |
|---|---|---|
| *A01C 7/20* | (2006.01) | |
| *A01C 7/10* | (2006.01) | |
| *A01C 21/00* | (2006.01) | |
| *A01C 7/04* | (2006.01) | |

(52) U.S. Cl.
CPC .............. *A01C 7/105* (2013.01); *A01C 7/20* (2013.01); *A01C 21/005* (2013.01); *A01C 7/046* (2013.01)

(58) Field of Classification Search
CPC .. A01C 7/04; A01C 7/042; A01C 7/16; A01C 7/206; A01C 7/102; A01C 7/105; A01C 21/005
USPC .................................................. 111/170–172
See application file for complete search history.

(56) References Cited

U.S. PATENT DOCUMENTS

| | | | |
|---|---|---|---|
| 5,596,130 A | 1/1997 | Baugher et al. | |
| 6,070,539 A | 6/2000 | Flamme et al. | |
| 6,298,797 B1 | 10/2001 | Mayerle et al. | |
| 6,347,594 B1 | 2/2002 | Wendling et al. | |
| 6,681,706 B2 | 1/2004 | Sauder et al. | |
| 6,941,225 B2 | 9/2005 | Upadhyaya et al. | |
| 7,021,224 B2 * | 4/2006 | Mayerle ................... | A01C 7/20 111/174 |
| 7,140,310 B2 * | 11/2006 | Mayerle ................... | A01C 7/06 111/175 |
| 7,426,894 B2 | 9/2008 | Peterson et al. | |
| 7,490,565 B2 | 2/2009 | Holly | |
| 7,631,606 B2 | 12/2009 | Sauder et al. | |

(Continued)

OTHER PUBLICATIONS

Raven multi-variety planter; Farming Industry News; http://farmindustrynews.com/planters/closer-look-industry-s-first-multi-hybrid-planter?NL=FIN-02&issue=FIN-02_20130614_FIN.

(Continued)

*Primary Examiner* — John Weiss
(74) *Attorney, Agent, or Firm* — Rebecca L. Henkel; Rickard K. DeMille

(57) ABSTRACT

A system for planting multiple types of seed and automatically switching between the varieties during planting in a single planting pass of a planting session of row-crop planting of an agricultural field while controlling seed delivery speed to mitigate seed bounce and/or provide desired seed spacing distances. The system may include a bulk storage system, an on-row storage system, and a charging system that selectively delivers seeds of different varieties from the bulk storage system to the on-row storage system and a seed delivery speed control system that regulates seed delivery speed.

17 Claims, 15 Drawing Sheets

(56) References Cited

U.S. PATENT DOCUMENTS

| | | | | |
|---|---|---|---|---|
| 7,938,075 | B1* | 5/2011 | Glendenning | A01C 7/046 111/185 |
| 8,468,960 | B2* | 6/2013 | Garner | A01C 7/20 111/171 |
| 8,543,238 | B2 | 9/2013 | Straeter | |
| 8,618,485 | B1 | 12/2013 | Teva et al. | |
| 8,726,620 | B2 | 5/2014 | Wollenhaupt et al. | |
| 8,757,073 | B2* | 6/2014 | Beaujot | A01C 7/06 111/175 |
| 8,942,894 | B2 | 1/2015 | Garner et al. | |
| 8,948,980 | B2 | 2/2015 | Garner et al. | |
| 9,148,992 | B2* | 10/2015 | Staeter | A01C 21/005 |
| 9,179,594 | B2* | 11/2015 | Graham | A01C 7/04 |
| 9,635,804 | B2* | 5/2017 | Carr | A01C 7/16 |
| 2005/0103244 | A1* | 5/2005 | Mayerle | A01C 7/06 111/175 |
| 2011/0178632 | A1* | 7/2011 | Straeter | A01C 7/10 700/219 |
| 2012/0174840 | A1* | 7/2012 | Friggstad | A01B 79/005 111/158 |
| 2012/0312209 | A1 | 12/2012 | Schaffert et al. | |
| 2014/0165890 | A1 | 6/2014 | Graham | |
| 2014/0174330 | A1 | 6/2014 | Garner et al. | |
| 2014/0182495 | A1 | 7/2014 | Wendte et al. | |
| 2014/0230705 | A1 | 8/2014 | Radtke et al. | |
| 2014/0277965 | A1 | 9/2014 | Miller | |
| 2015/0059629 | A1 | 3/2015 | Kinzenbaw et al. | |
| 2015/0059630 | A1* | 3/2015 | Kinzenbaw | A01C 7/044 111/200 |
| 2015/0223391 | A1* | 8/2015 | Wendte | A01C 7/04 111/177 |
| 2015/0351314 | A1* | 12/2015 | Sauder | A01C 7/046 700/275 |
| 2016/0037713 | A1* | 2/2016 | Wendte | A01C 21/005 111/177 |
| 2016/0143213 | A1* | 5/2016 | Kowalchuk | A01C 7/127 111/170 |
| 2016/0234996 | A1* | 8/2016 | Sauder | A01C 21/005 |

OTHER PUBLICATIONS

Kinze multiple variety planter; website; http://www.kinze.com/article.aspx?id=167&Kinze+Announces+the+World%27s+First+Electric+Multi-Hybrid+Concept+Planter.

Farm Industry News; John Deere ExactEmerge; Feb. 17, 2015; 3 pages; http://farmindustrynews.con/planters/super-fast-planter.

Gaspardo; MT Precision Seed Drill; Feb. 17, 2015; 2 pages; http://www.opico.co.uk/gaspardo-machines/precision-drills/mt.php.

Farm Industry News; Closer look: Industry's First Multi-hybrid Planter; Jun. 13, 2013; 3 pages; http://farmindustrynews.com/planters/closer-look-industry-s-first-multi-hybrid-planter?NL=FIN-02&Issue=FIN-02_20130614_FIN-02_117&YM_RID=larsondw@gmail.com&YM_MID=1401285&sfyc4enews=42.

Farm Equipment; Ahead of the Curve: Multiple Hybrid Planters, Seeders to Debut Soon; Mar. 1, 2014; 3 pages; http://www.farm-equipment.com/blogs/6/post/11488-ahead-of-the-curve-multiple-hybrid-planters-seeders-to-debut-soon.

Precision Planting; Speed Tube; 7 pages; Copyright © 2015 Precision Planting LLC; http://www.precisionplanting.com/#products/speedtube/.

* cited by examiner

METERING AND BULK FILL CONFIGURATIONS

| METERING SYSTEM | | BULK FEED SYSTEM | | | |
|---|---|---|---|---|---|
| | | INDIVIDUAL LINE FOR EACH VARIETY FOR EACH ROW | SINGLE LINE FOR EACH VARIETY FEEDING MULTIPLE ROWS | SINGLE LINE FOR EACH ROW FEEDING ALL VARIETIES | SINGLE LINE FEEDING ALL VARIETIES FOR ALL ROWS |
| METER | ON-ROW STORAGE | ⌐135 143 | ⌐137 145 | ⌐139 147 | ⌐141 149 |
| SINGLE | SINGLE | FIG. 7 (96) | FIG. 8 (4) | FIG. 9 (24) | FIG. 10 (1) |
| SINGLE | MULTIPLE | FIG. 11 (96) | FIG. 12 (4) | FIG. 13 (24) | FIG. 14 (1) |
| MULTIPLE* | MULTIPLE* | (96) | (4) | (24) | (1) |
| | | ⌐151 | ⌐153 | ⌐155 | ⌐157 |

*MULTIPLE/MULTIPLE WOULD LOOK THE SAME AS SINGLE/MULTIPLE EXCEPT THERE WOULD BE ADDITIONAL SEED METERS INTERNALLY FOR EACH VARIETY ON EACH OF THE ROW UNITS

**NUMBER IN PARENTHESIS IS THE NUMBER OF INDIVIDUAL LINES REQUIRED TO FEED SEED TO ALL THE ROWS FOR A 24 ROW PLANTER. THE NUMBER OF LINES COULD BE MORE THAN THIS NUMBER, DEPENDING ON THE SIZE OF THE LINE SELECTED AND THE CAPABILITY OF THAT LINE TO TRANSFER SEED AT THE REQUIRED RATE.

FIG. 17

MULTIPLE SEED-TYPE PLANTING SYSTEM WITH SEED DELIVERY SPEED CONTROL

FIELD OF THE INVENTION

The invention relates generally to planters and, in particular, to planters for planting multiple types or varieties of seed and controlling seed delivery speed from the planters.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduces the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit.

SUMMARY OF THE INVENTION

The present invention is directed to systems for row crop planting that allow for seeding or planting multiple types of seed while controlling seed delivery speed(s) from planters, which may include planting at varying rates, in a single planting pass. The system may allow for multiple types of seed to be delivered through a seed distribution system from multiple compartments respectively storing the multiple types of seed on an agricultural implement to a seed delivery system of the agricultural implement. The seed distribution system of the agricultural implement is controlled to release seeds of the multiple types to the seed delivery system for release onto multiple areas of an agricultural field and at delivery speeds that are controlled to mitigate seed bounce and/or provide a desired seed spacing distance.

According to one aspect of the invention, a planter is provided for planting seed of multiple seed types in a single planting pass during row-crop planting of an agricultural field and controlling seed delivery speed. The planter has a frame supporting multiple row units and a seed storage system for separately storing seeds of multiple seed types on the planter. A seed-metering system is arranged at each of the multiple row units and selectively receives the seeds of the multiple seed types from the seed storage system. A seed delivery speed control system receives the seeds from the seed-metering system and releases the seeds for planting of an agricultural field. The seed delivery speed control system may adjust a delivery speed of the seeds based on at least one of a travel speed of the planter and a target spacing distance corresponding to the one of the multiple seed types delivered from the seed-metering system to the seed delivery speed control system.

According to another aspect of the invention, the seed delivery speed control system may include a seed delivery speed control device extending away from an outlet of the seed meter to direct the seeds toward a seed trench in the agricultural field. The seed delivery speed control device may include or be defined by a speed tube with an upper end receiving the seeds from the seed meter and a lower end extending away from an outlet of the seed meter to direct the seeds toward a seed trench in the agricultural field. The speed tube may include a belt configured to rotate at a variable speed for adjusting delivery speed of the seeds released from the speed tube.

According to another aspect of the invention, the seed delivery speed control system may be configured to adjust the delivery speed of the seeds to approximate a detected travel speed of the planter with the seeds delivered in a delivery direction that is opposite a travel direction of the planter. This may provide a seed drop path that is substantially vertical-only with respect to a seed trench of the agricultural field.

According to another aspect of the invention, the seed delivery speed control system may be configured to adjust the delivery speed of the seeds to approximate a target spacing between adjacent seeds in a common seed trench based on a predetermined target seed population for a corresponding one of the multiple seed types of seeds being released when the adjustment is made.

According to another aspect of the invention, the seed delivery speed control system may include at least one sensor arranged for detecting delivery speed of the seeds. A pair of spaced apart sensors may be arranged for detecting movement of a seed past each of the sensors for determining detecting speed of the seeds delivered from the seed delivery speed control system. The pair of spaced apart sensors may be arranged relative to a discharge tube of the seed delivery speed control system for detecting movement of each seed through the discharge tube.

According to another aspect of the invention, a charging system may be provided that is configured to selectively deliver seeds of the multiple seed types to the seed meter. The charging system may be arranged upstream of the seed meter with the seed delivery speed control system arranged downstream of the seed meter.

According to another aspect of the invention, the seed storage system may include a bulk storage system for separately storing seeds of multiple types on the planter. The bulk storage system may be configured for separately storing seeds of at least some of the multiple seed types on the planter at a remote location relative to the multiple row units. The seed storage system may include an on-row storage system separately storing the seeds of the multiple seed types at the row units. The charging system may selectively transfer seeds of the multiple seed types from the bulk storage system to the on-row storage system.

According to another aspect of the invention, a diverter system may be arranged between the bulk storage system and the on-row storage system for selectively defining passages between the bulk storage system and the on-row storage system to direct seeds of the multiple seed types into corresponding ones of multiple compartments of the on-row storage system. The diverter system may include a gate system with gates configured to actuate for defining the passages between the bulk storage system and the on-row storage system to direct seeds of the multiple seed types into corresponding ones of multiple compartments of the on-row storage system.

According to another aspect of the invention, a speed tube may receive the seeds from the seed-metering system and release the seeds for planting of an agricultural field. The speed tube may have a conveyance mechanism configured to move at an adjustable speed to vary the delivery speed of the seeds. The conveyance mechanism may be a belt rotated by a belt drive at a variable speed to adjust the delivery speed of the seeds. The adjustment may be made based on at least one of a travel speed of the planter and a target spacing distance corresponding to the one of the multiple seed types delivered from the seed-metering system to the seed delivery speed control system. A bulk storage system may separately store seeds of multiple types on the planter and an on-row storage system may separately store the seeds of the multiple seed at the row units for selective delivery to the seed-metering system with a charging system that selectively transfers seeds of the multiple seed types from the bulk storage system to the on-row storage system.

According to another aspect of the invention, a method is provided for planting seed of multiple seed types in a single planting pass during row-crop planting of an agricultural field and controlling seed delivery speed. The method may include separately storing seeds of multiple seed types on a planter having multiple row units. Seeds of the multiple seed types may be selectively delivered to a seed-metering system at each of the multiple row units. The seeds may be singulated in the seed-metering system at each row unit. The singulated seeds may be delivered from the seed-metering system to a seed delivery speed control system releasing the singulated seeds to a seed trench of the agricultural field. A delivery speed of the seeds released from the seed delivery speed control system may be adjusted based on at least one of a travel speed of the planter and a target spacing distance corresponding to the one of the multiple seed types being released from the seed delivery speed control system.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 17 shows a chart illustrating the variants of FIGS. 9-16;

DETAILED DESCRIPTION OF THE PREFERRED EMBODIMENTS

Figure 1:
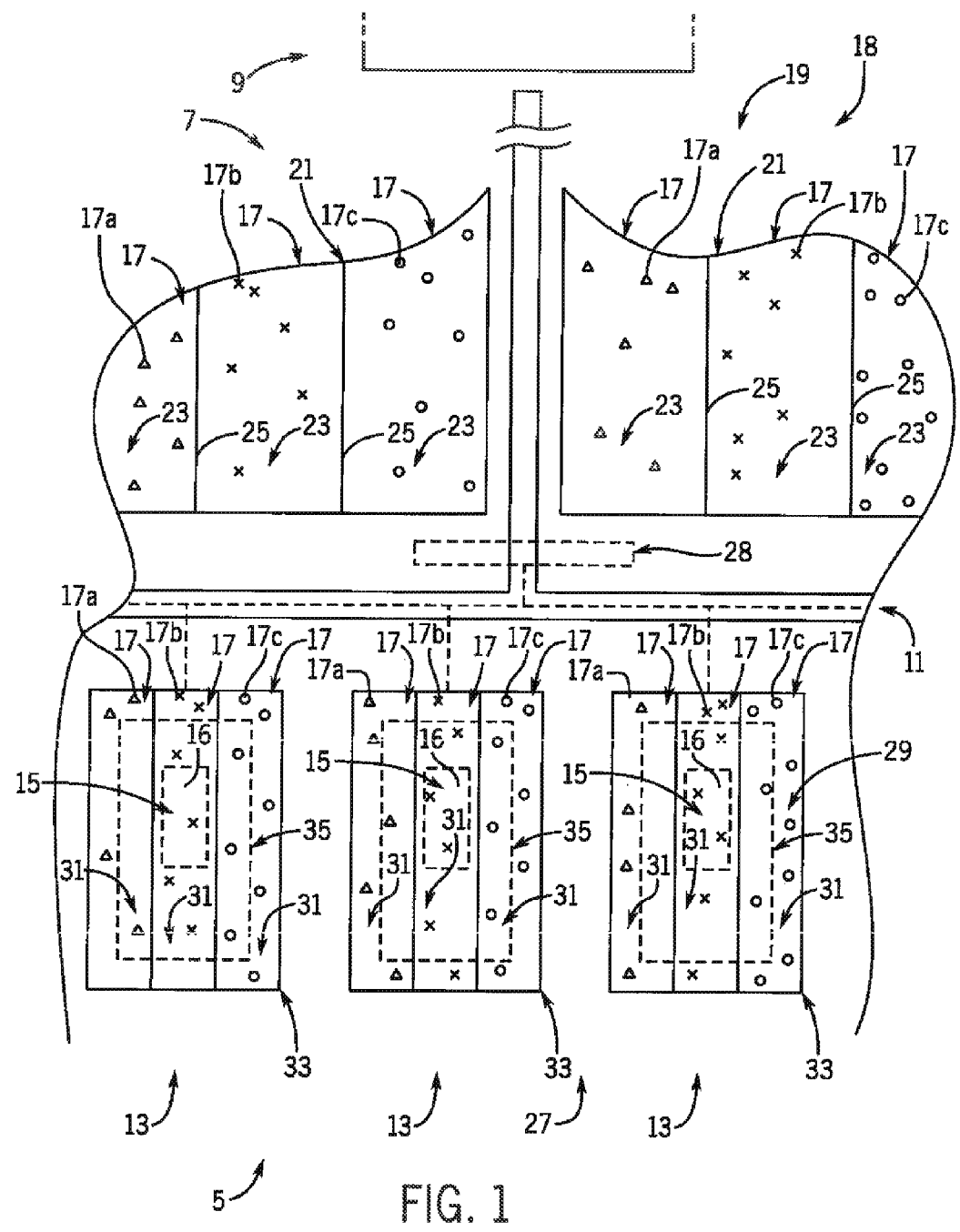
FIG. 1 is a simplified schematic representation of a planting system for planting multiple varieties of seed.

Referring now to the drawings and specifically to FIG. 1, a planting system 5 for planting multiple types or varieties of seed and automatically switching between the types or varieties during planting in a single planting pass and simultaneously automatically controlling seed delivery speed while row-crop planting of an agricultural field is schematically shown. System 5 includes an agricultural implement, shown here as planter 7, which may be one of the EARLY RISER® series planters available from Case IH and typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the opened furrow to close the furrow and to further firm the soil over the seed to and promote favorable seed-to-soil contact. Seed delivery speed control system 15 is configured to control delivery speed(s) of seeds from the planter 7 to minimize seed bounce and/or provide a desired seed spacing distance(s). Seed delivery speed control system 15 includes a seed delivery speed control device 16, which can be independently controllable, at each row unit 13 as explained in greater detail elsewhere herein.

Still referring to FIG. 1, seed 1 is held in a seed storage system 18. In this embodiment, seed 17 is held in bulk storage in a bulk storage system 19 of seed storage system 18. Bulk storage system 19 has at least one bulk fill hopper 21, shown here as having two central bulk fill hoppers 21 supported by the frame 11 of the planter 7, remote from the row units 13. The bulk storage system 19 has multiple compartments 23, shown here as spaces within each of the hoppers 21 that are separated by a divider wall or partitions 25. In another embodiment, the compartments 23 are defined by separate and discrete containers themselves, such as the hoppers 21. Bulk storage system 19 can be configured to provide at least some on-row bulk storage, which may include some or all of the compartments 23 of the bulk storage system 19 as manual-fill on-row storage compartments, as explained in greater detail elsewhere herein. The different compartments 23 may hold seeds 17 of a different plant type or a common plant type but different varieties or types 17a, 17b, 17c for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones VZ1, VZ2, VZ3, VZ4 in the prescription map PM of FIG. 19. Although three different seed varieties or types 17a, 17b, 17c are shown, it is understood that other numbers of seed varieties may be stored on and planted by the planter 7 based on, for example, the number of compartments 23 in the bulk storage system 19 for a particular planter 7. Although the seed 17 may be described elsewhere herein as different types 17a, 17b, 17c, it is understood that the description of the different types of seed includes different varieties. In other words, the different types 17a, 17b, 17c of seed 17 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats and barley, different cover crops such as tillage radishes and rye, or various combinations of these or other combinations.

Figure 2:
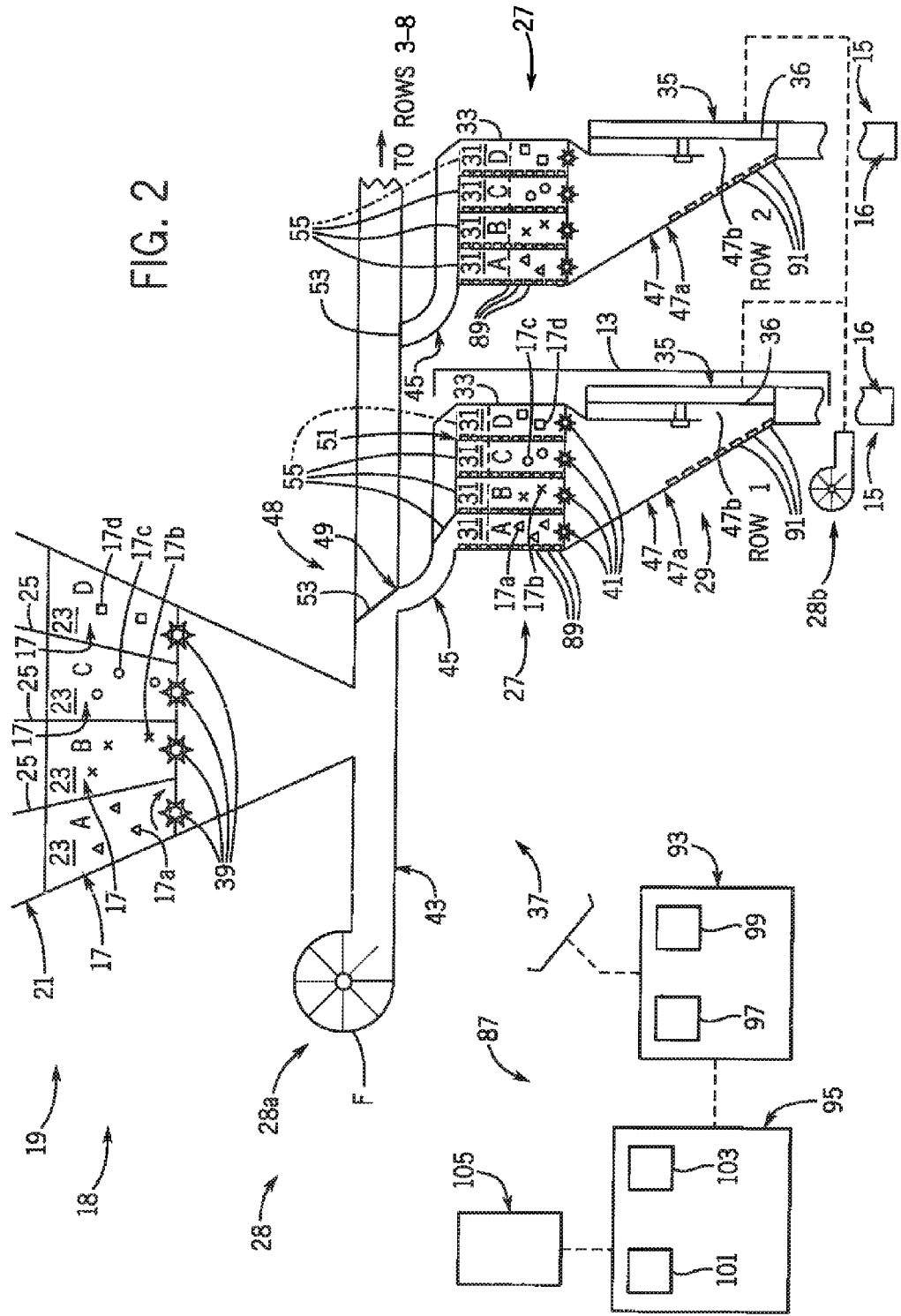
FIG. 2 is a simplified schematic representation of a charging system of the planting system of FIG. 1 showing a step of charging an on-row seed storage system.

Still referring to FIG. 1, based on which type or variety zone of an agricultural field is being planted at a particular time, seeds of the different types 17a, 17b, 17c are selectively released from the bulk storage system 19 for receipt into an on-row storage system 27 of the seed storage system 18 by way of an airflow system 28 (FIG. 2). Referring now to FIG. 2, the airflow system 28 provides pneumatic power for use by various components of the planter 7 and is used to convey seeds 17 through the planter 7 to the row units 13 to be dropped into the seed trench formed by the furrow opening mechanism. Airflow system 28 includes a positive air pressure source and may include a vacuum source for establishing positive and vacuum pressures and corresponding airflows. The positive air pressure source and vacuum sources can be known pumps, fans, blowers, and/or other known airflow system components. Airflow system 28 can include a seed conveyance airflow system 28a providing an airflow by way of fan "F" that entrains seeds 17 to move the seeds 17 from bulk storage system 19 to the row units 13 and a seed meter airflow system 28b provides native and/or positive pressure for operation of seed meters at the row units 13, as explained in greater detail elsewhere herein. Each of the seed conveyance and seed meter airflow systems 28a, 28b includes a positive air pressure source(s) and/or vacuum source(s), depending on the particular configurations of the pneumatic system(s) in which they are incorporated. Referring again to FIG. 1, the on-row storage system 27 locally stores relatively small amounts of seeds 17 at each of multiple row units 13 to feed a seed-metering system 29 which can be configured to simultaneously plant different types 17a, 17b, 17c from the different row units 13, or otherwise switch seed types 17a, 17b, 17c being planted, as explained in greater detail elsewhere herein. The different seed types 17a, 17b, 17c selectively sent from the bulk storage system are stored in multiple compartments 31 of the on-row storage system 27 at each row unit 13. The compartments 31 of the on-row storage system 27 may be defined within a vented mini-hopper 33 receiving seeds from the bulk storage system 19, optionally, at least one on-row bulk tank, or other separate and distinct compartments on the row unit 13.

Still referring to FIG. 1, the compartments 31 of the on-row storage system 27 selectively feed the seed types 17a, 17b, 17c to a seed meter 35 of the seed-metering system 29. Each seed meter 35 can be a purely mechanical-type seed meter 35 or a pneumatic seed meter 35. Referring now to FIG. 2, the seed meter 35 includes an internal seed disk 36 that is rotated to move at least a surface of the seed disk through a seed pool inside of the seed meter 35 to pick up and singulate seeds using seed pockets or fingers from the internal seed pool and convey the individual seeds through the seed meter 35 for individual release out of the seed meter 35 through the seed delivery speed control device 16 that controls seed delivery speed of seed 17 toward a seed trench of the agricultural field. Pneumatic seed meters 35 of negative pressure types are further operably connected through a vacuum inlet to the seed meter airflow system 28b (FIG. 2) of the airflow system 28 to provide a vacuum airflow within a vacuum chamber establishing a negative or vacuum pressure within the seed meter 35 opposite the seed pool allowing the seeds to be held against the seed disk such as within the seed pockets by the vacuum pressure. Pneumatic seed meters 35 of positive pressure types are operably connected through a pressurized air inlet to the seed meter airflow system 28b (FIG. 2) to provide a positive airflow and a corresponding positive pressure at the seed side of the seed disk within the seed meter 35, whereby seeds from the seed pool are pushed and held against the seed disk such as within the seed pockets by positive pressure. The seed meter 35 includes a housing that defines a cavity in which a seed singulator that is adjustable, such as remotely adjustable, and configured to inhibit more than one seed from being discharged from the seed meter 35 per seed discharge event and a seed disk 36 (FIGS. 2-4) are arranged and a baffle that is adjustable, such as remotely adjustable, and configured to control the depth of seed in the meter that is exposed to the seed disk 36. Rotation of the seed disk including speed of rotation in the housing cavity adjustable such as remotely adjustable by controlling a seed disk drive system. The seed disk drive system may include, for example, various electric or hydraulic motors, drive shafts, chains and belts, clutches, peg and hole drive systems, and/or other arrangements such as a directly driven arrangement in which a motor directly drives the seed disk at its hub or periphery. The seed meters 35 are operably connected to a control system for adjusting seed disk 36 rotational speed for adjusting the seed population, seed singulator setting, vacuum level, baffle position, and/or seed depth inside the seed meter 35 reservoir, as explained in greater detail elsewhere herein.

Figure 3:
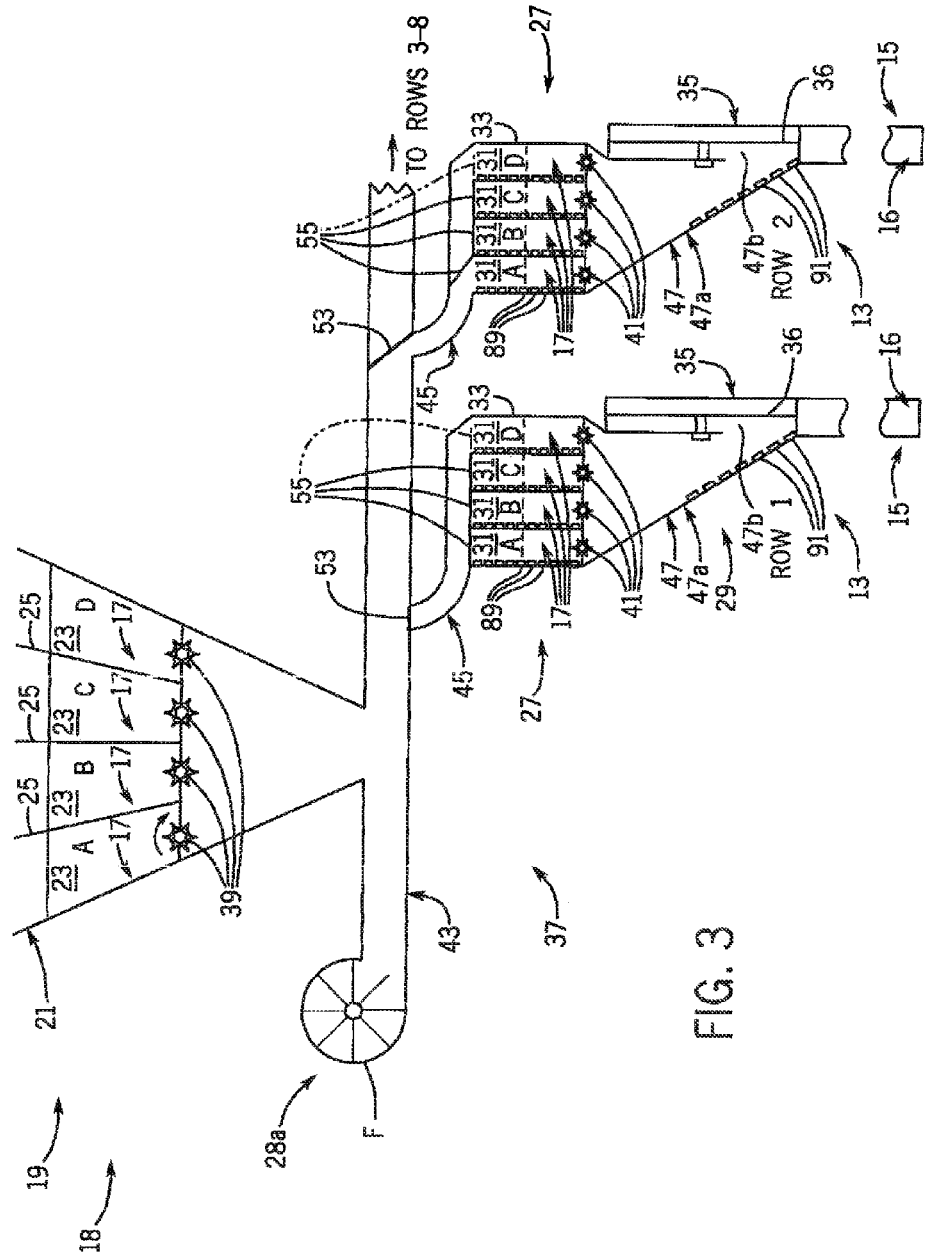
FIG. 3 is a simplified schematic representation of a charging system of the planting system of FIG. 1 showing another step of charging an on-row seed storage system.
Figure 4:
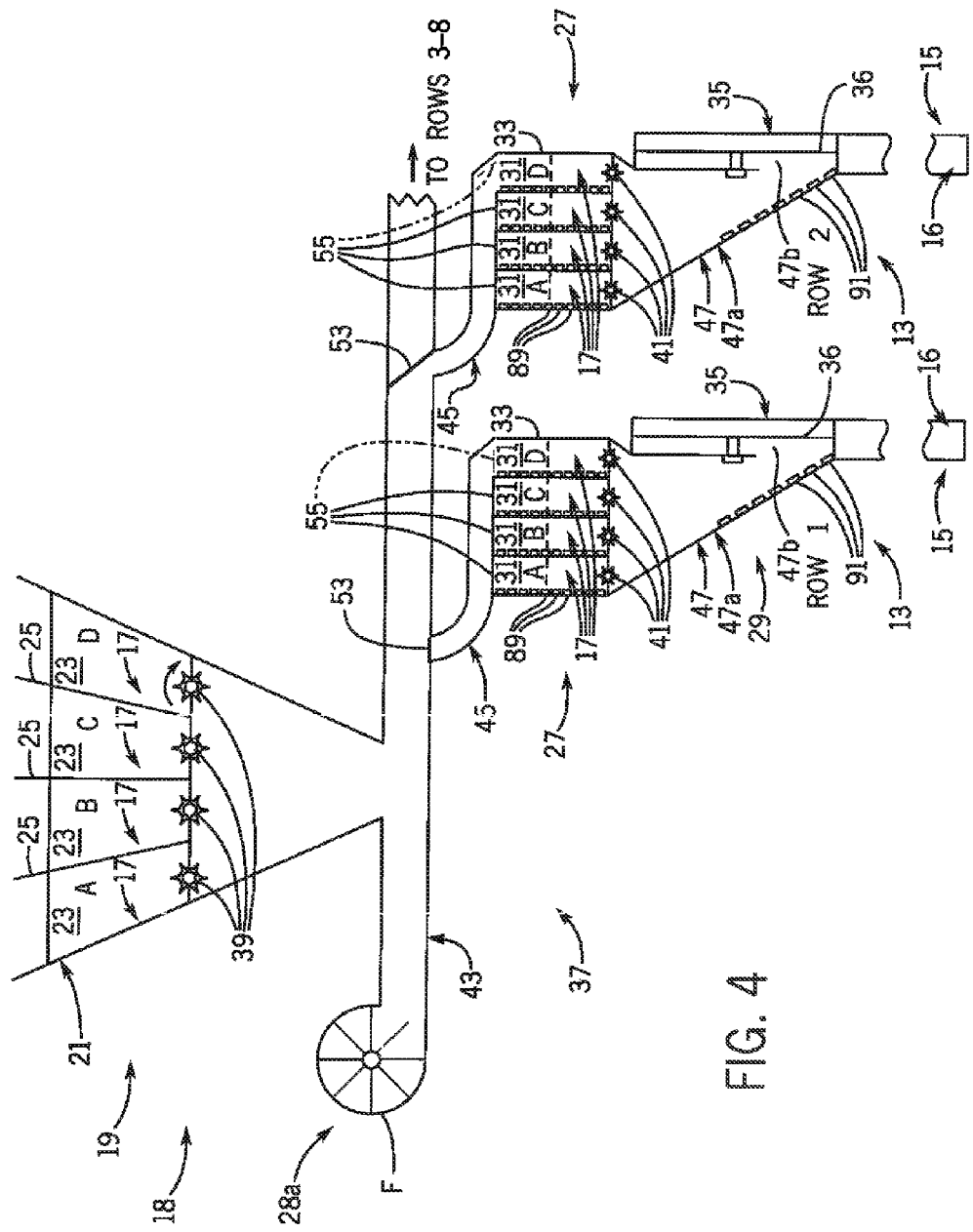
FIG. 4 is a simplified schematic representation of a charging system of the planting system of FIG. 1 showing another step of charging an on-row seed storage system.

Referring now to FIGS. 2-4, system 5 is shown configured for delivering four seed types 17a, 17b, 17c, 17d that can be selectively delivered from the bulk storage system 19 to the row units 13 by way of a charging system 37 that includes the seed conveyance airflow system 28a. Charging system 37 ensures that each seed meter 35 can be selectively delivered controlled amounts of seed of different types 17a, 17b, 17c, 17d based on the different type or variety zones of the agricultural field. The charging system 37 includes rollers such as calibrated fluted rollers 39, 41 at outlets of the compartments 23, 31 of the bulk and on-row storage systems 19, 27, respectively. The rollers 39, 41 are driven by electric, pneumatic, or hydraulic motors to control release of known or calibrated amounts of the seed types 17a, 17b, 17c, 17d from the respective compartments 23, 31. The rollers 39 are rotated in controlled amounts to control release of the seed types 17a, 17b, 17c, 17d out of the compartments 23 of the bulk storage system 19 and into a primary or main frame seed conduit or seed line shown as primary seed feeding line(s) 43 for being selectively directed into secondary or row-unit seed conduits shown as secondary seed feeding line(s) 45. Rollers 41 are rotated in controlled amounts to control release of the seed types 17a, 17b, 17c, 17d out of the compartments 31 of the on-row storage system 27 into a row unit reservoir 47 having a funnel 47a that connects to a seed inlet of the seed meter 35 to deliver seed into a seed chamber 47b that holds seed as a seed pool within an interior cavity of the seed meter 35. It is understood that instead of by way of rollers 39, 41, the controlled downstream release of seeds 17 from the bulk and on-row storage systems 19, 27 may instead be provided by actuating other valving mechanisms or metering devices such as augers or sliding or pivoting gates. Outlets of compartments 23 in the bulk storage system 19 can be operably connected to a seed receiving induction system or bulk metering box(es) that control release of seeds 17 into the seed feeding line(s) 43 connected to such induction system or bulk metering box(es). Outlets of compartments 31 of the on-row storage system 27 can have sliding or pivoting gates to control release of seeds 17 into the seed meters 35.

Still referring to FIGS. 2-4, charging system 37 includes a diverter system 48 (FIG. 2) arranged within the seed conveyance airflow system 28a to selectively control seed conveyance through the planter 7. This may include selectively defining flow paths for the seed 17 through the planter 7 based on location of the planter 7 relative to the multiple type zones VZ1, VZ2, VZ3, VZ4 of the agricultural field or other performance characteristics of the planter 7 at a given time. Diverter system 48 can include a first seed gate system 49 (FIG. 2) and a second seed gate system 51 (FIG. 2) that are arranged within the main frame and row unit seed conduits or primary and secondary seed feeding lines 43, 45 for selectively defining passages within the charging system 37 to ensure that the seed types 17a, 17b, 17c, 17d are directed from the compartments 23 of the bulk storage system 19 into the appropriate compartments 31 of the on-row storage system 27. The first seed gate system 49 includes multiple seed gates 53 that are independently moved by respective actuators to direct seed 17 into one(s) of the seed conduit(s) or secondary seed feeding lines 45 of one(s) of the row units 13. The second seed gate system 51 includes multiple compartment gates or seed gates 55 that are independently moved by respective actuators to direct seed 17 into one(s) of the compartments 31 of the on-row storage system 27.

Figure 5:
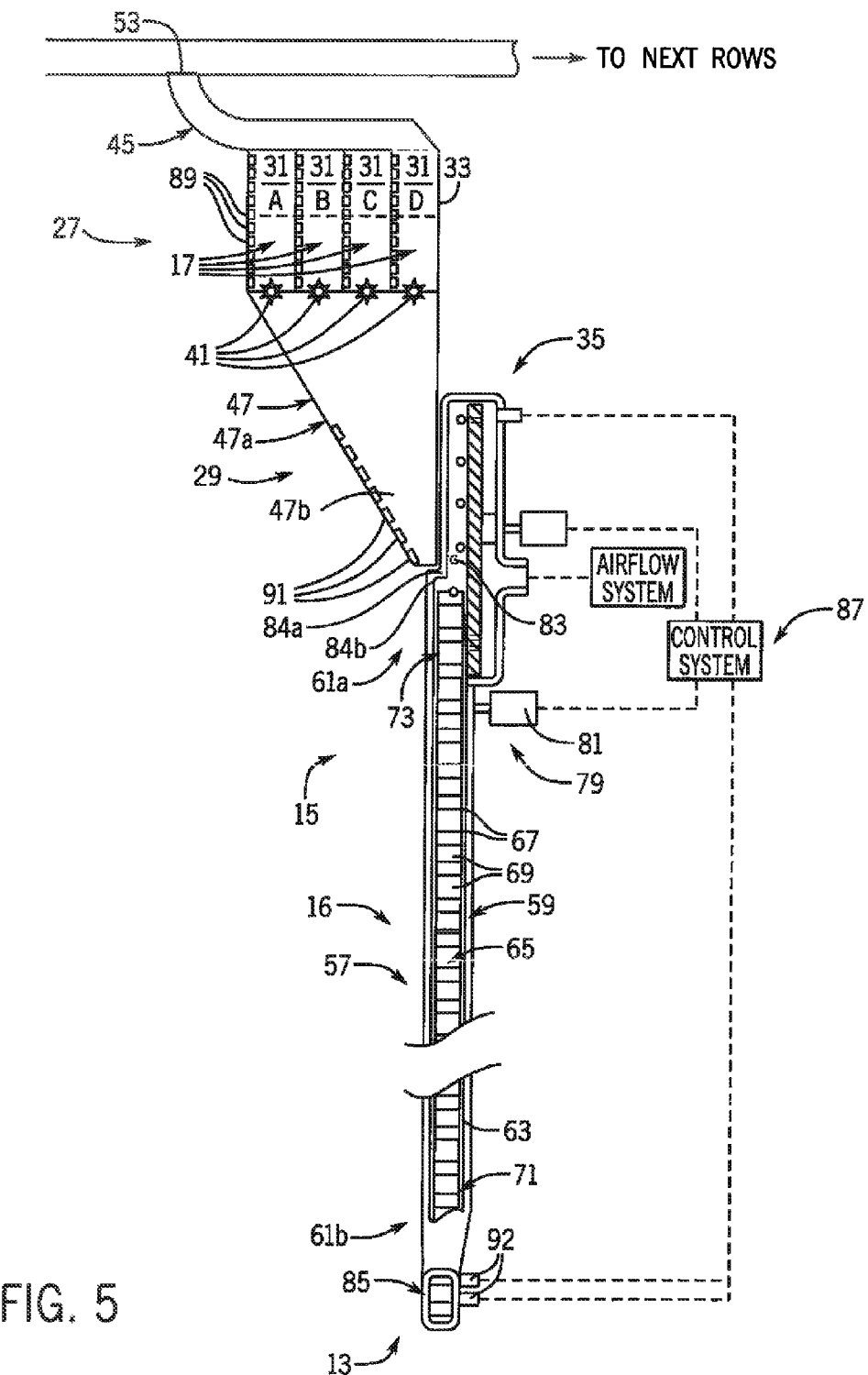
FIG. 5 is a simplified schematic representation of a portion of a charging system and a seed delivery speed control system of the planting system of FIG. 1.
Figure 6:
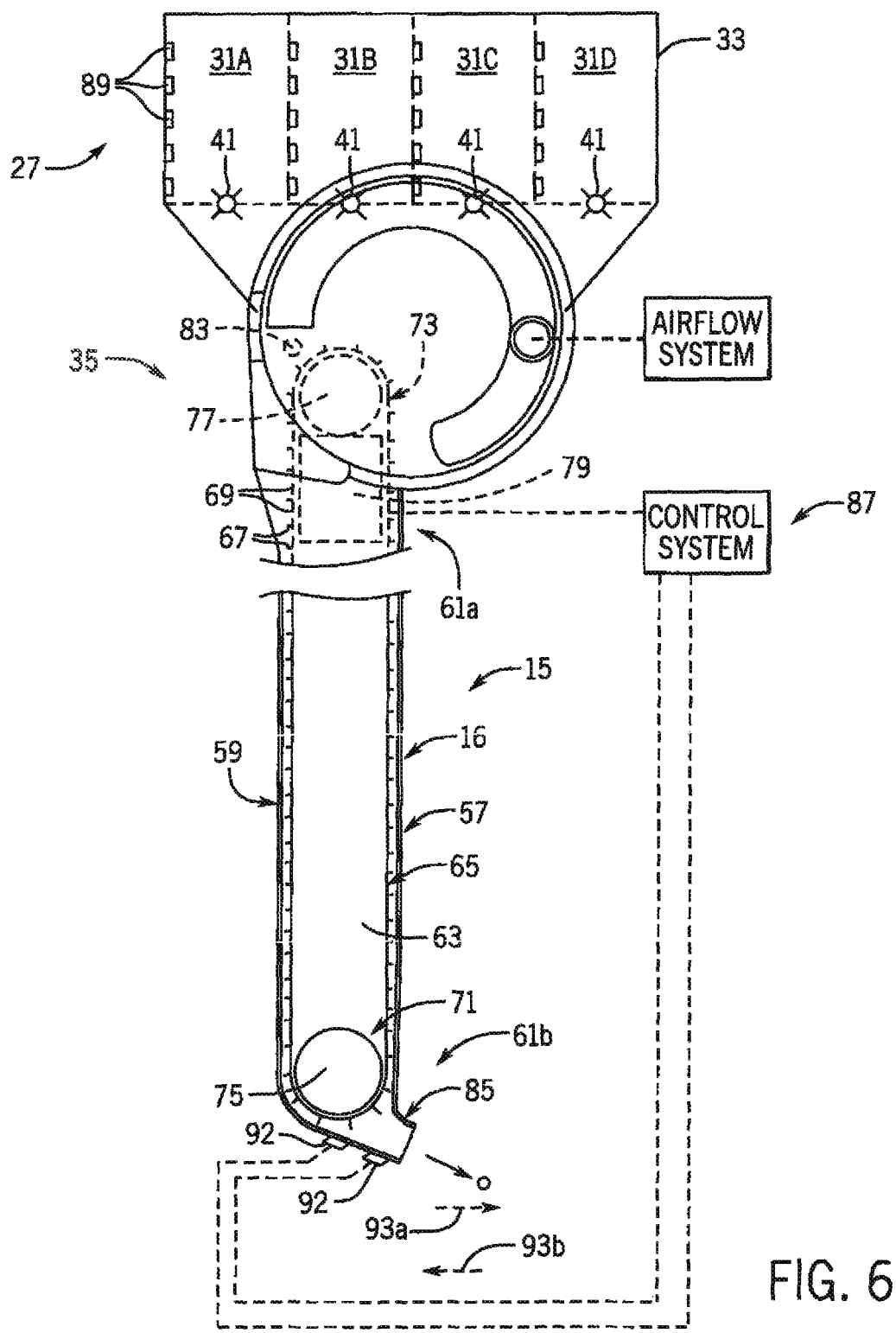
FIG. 6 is another simplified schematic representation of a portion of a charging system and a seed delivery speed control system of the planting system of FIG. 1.

Referring now to FIGS. 5 and 6, after or during charging system 37 (FIGS. 2-4) charging or maintaining charge of on-row storage system 27, seed meter 35 releases seeds 17 into the seed delivery speed control system 15 that can adjust delivery speed of the seeds 17 to mitigate seed bounce and/or provide a desired seed spacing distance by way of the seed delivery speed control device 16. Seed delivery speed control device 16 is shown as speed tube 57 that receives seeds 17 from an outlet of the seed meter 35 and delivers the seeds 17 to the seed trench of a furrow in the field. Speed tube 57 is controlled to deliver seeds 17 with a rearward velocity that is substantially the same as the forward velocity of the planter. In this way, the speed tube 57 delivers seeds 17 with a speed that matches the speed of the planter, but in the opposite direction, whereby the seed has a horizontal velocity of approximately zero mph. This minimizes the chances of the seed 17 bouncing forward as it comes into contact with the soil in the trench. Speed tube 57 includes tube housing 59 with an upper end at upper end 61a of the speed tube that connects to seed meter 35. Housing 59 surrounds an interior cavity 63 (FIG. 6) in which belt 65 is arranged as an adjustable speed conveyance mechanism with outwardly extending fingers 67 defining belt pockets 69 between adjacent fingers 67. Referring now to FIG. 6, belt 65 is supported for rotation at lower and upper ends 71, 73 of the belt 65 on lower and upper pulleys 75, 77 at upper and lower ends 61a, 61b of speed tube 57. Upper pulley 77 is driven by belt drive 79 that includes motor 81 (FIG. 5) directly or may include a gear train transmitting rotation of an output shaft of the motor 81 to rotation of the upper pulley 77. Rotation of upper pulley 77 drives rotation of belt 65 to pass the belt pockets 69 under release location 83 defined inside of seed meter 35 where the seeds are released from seed disk 36. Release location 83 inside the seed meter 35 may correspond to a position of vacuum cutoff in the seed meter 35 for pneumatic versions of seed meter 35. Referring again to FIG. 5, seeds 17 that fall off seed disk 36 at release location 83 pass through a seed meter outlet 84a and an aligned speed tube inlet 84b and are singularly received in belt pockets 69 and carried down speed tube 57 and released from speed tube 57 through discharge tube 85 near lower pulley 75.

Referring now to FIGS. 2-6, a control system 87 includes various sensors for determining performance conditions of various systems and components within the planter 7, allowing their control. These include seed-level sensors 89 in the compartments 31 of the on-row storage system 27 configured for determining an amount of seeds of the different types 17a, 17b, 17c, 17d in compartments 31. Seed-level sensors 91 (FIGS. 2-5) in the row unit reservoir 47 are configured for determining an amount of seed(s) of the different types 17a, 17b, 17c, 17d in compartments 31 and row unit reservoir 47, whereby signals from the seed-level sensors 91 correspond to an amount of seed in the seed pool of the seed chamber 47b of the seed meter 35. It is understood that the seed-level sensors 81, 91 can instead be a single sensor to indicate low level rather than actual level.

Referring again to FIGS. 5 and 6, a pair of seed sensors 92 are spaced from each other a known distance and arranged upon the discharge tube 85 and configured to detect seed 17 traveling past each sensor 92. Control system 87 uses timing of the seeds 17 and distance between the seed sensors 92 to calculate speed of the seed 17 and the horizontal velocity component for comparisons with travel speed of the planter 7 for adjusting the speed tube 57 to speed match the seed speed represented in FIG. 6 as rearward horizontal velocity component 93a of the seed speed to the planter speed represented in FIG. 6 as forward horizontal velocity component 93b of the planter 7 and tractor 9. The seed release speed can also be calculated based on a known relationship of the rotational speed of the upper pulley 77, output shaft of the belt drive motor 81 or other rotating component in the belt drive 79, and velocity of the seed 17 leaving the speed tube 57 and detecting rotational speed of such rotating component. Other sensors include those arranged within the seed meters 35 to allow making adjustments to control performance of the seed meters 35, based on size or other characteristics of the different types 17a, 17b, 17c, 17d, including controlling the seed singulator, vacuum, baffle, seed disk rotational speed, and seed depth inside a reservoir within the seed meter.

Figure 7:
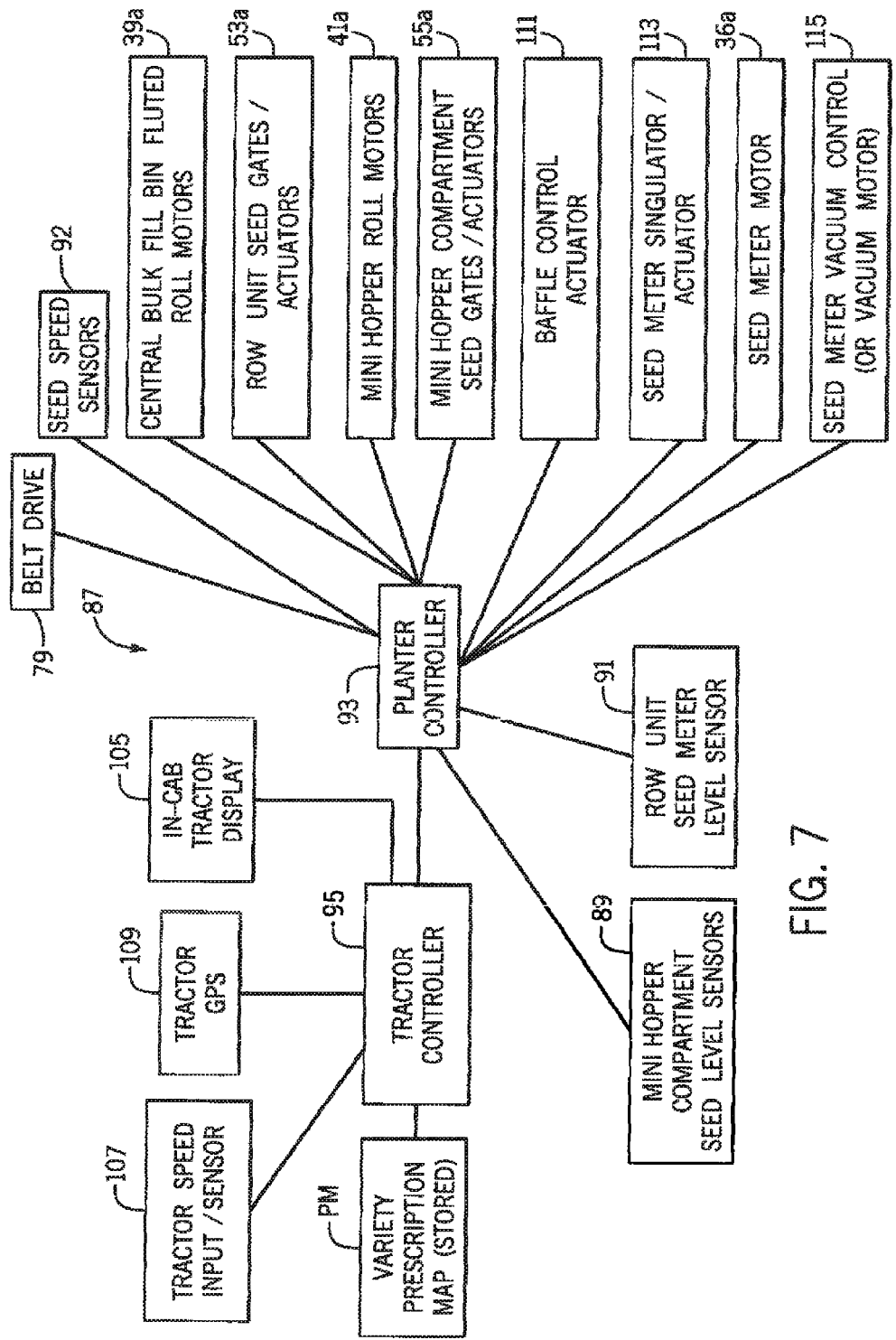
FIG. 7 is a simplified schematic representation of a control system of the planting system of FIG. 1
Figure 19:
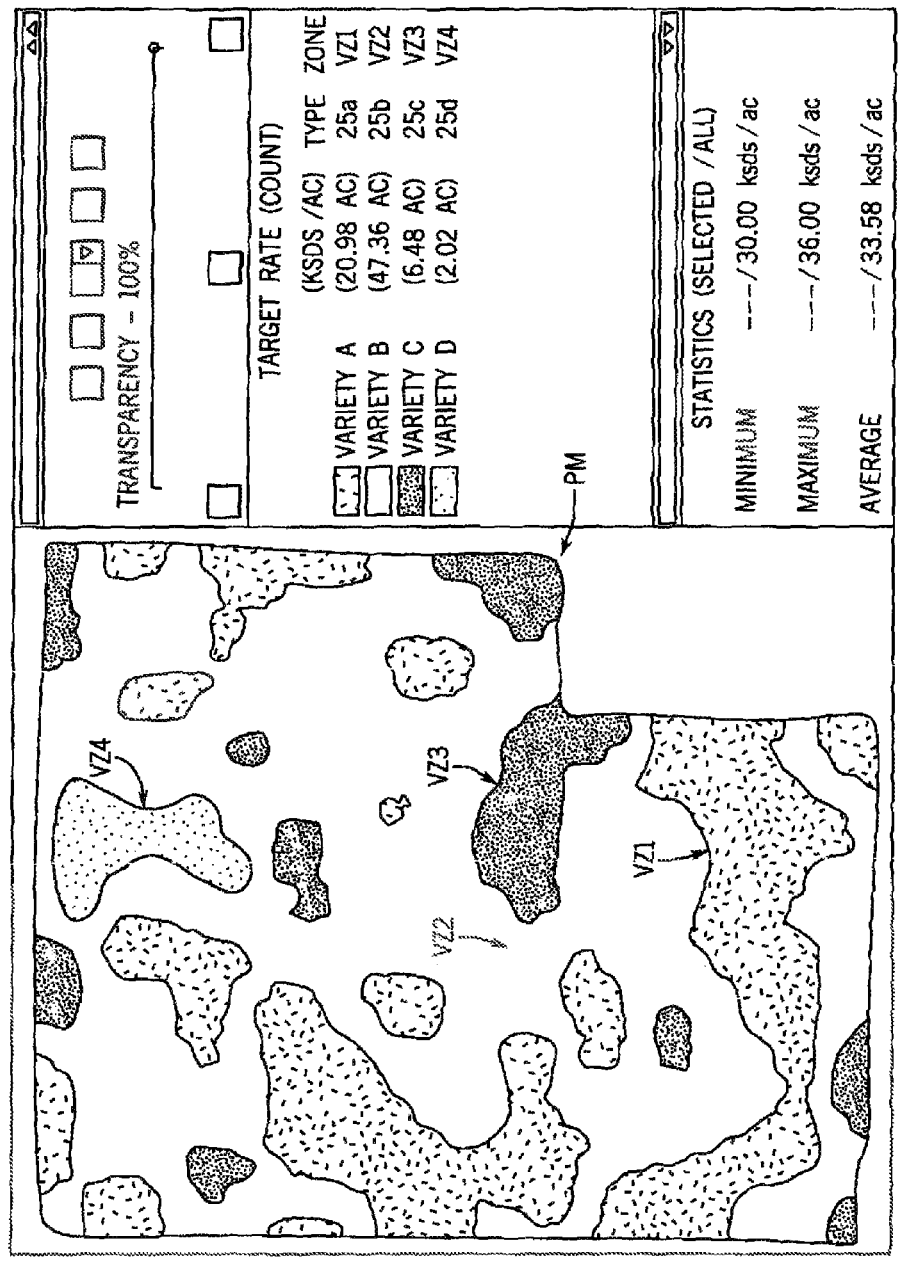
FIG. 19 is an example of a seed variety prescription map for use with the planting system.

Referring now to FIGS. 2 and 7, a planter controller 93 and a tractor controller 95 of the control system 87 operably communicate with each other, for example, by way of an ISOBUS connection, for coordinating controls of planter 7, including which seed type 17a, 17b, 17c, 17d and at what seed delivery speed from planter 7, and tractor 9 (FIG. 1) based on the type or variety zones VZ1, VZ2, VZ3 of the agricultural field, which may correspond to a seed type or variety prescription map PM as shown in FIG. 19. In FIG. 2, the planter controller 93 is shown including a controller 97 and power supply 99. The controller 97 of the planter controller 93 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the planter 7. The tractor controller 95 is configured for controlling operations of the tractor 9 such as controlling steering, speed, braking, shifting, and other operations of the tractor 9. In FIG. 2, the tractor controller 95 is shown including a controller 101 and power supply 103. The tractor controller 95 is configured for controlling the functions of the tractor 9 by controlling the various GPS steering, transmission, engine, hydraulic, and/or other systems of the tractor 7. Like the controller 97 of the planter controller 93, the controller 101 of the tractor controller 95 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 9. A tractor interface system 105 is operably connected to the tractor controller 65 and includes a monitor and various input devices to allow an operator to see the statuses and control various operations of the tractor 9 from within the cab of the tractor 9. The tractor interface system 105 may be a MultiControl Armrest™ console available for use with the Maxxum™ series tractors from Case IH.

Referring now to FIG. 7, during use of system 5, control system 87 can determine planter position, speed, heading, and/or other movement characteristics by way of monitoring tractor position and movement through the tractor controller 95. Tractor controller 95 evaluates a speed input signal from a tractor speed sensor 107 along with a GPS signal or data from tractor GPS 109 with respect to the prescription map PM (FIG. 19). Referring again to FIG. 2, using such evaluations, control system 87 determines which row units 13 should plant which seed type(s) 17a, 17b, 17c, 17d and when, along with determining a charging strategy for the compartments 31 of the on-row storage system 27, to achieve such multi-seed type planting. To facilitate determining the charging strategy, control system 87 interrogates seed levels of seed types 17a, 17b, 17c, 17d and/or other operational characteristics at each row unit 13. This can be done by evaluating signals from the mini-hopper compartment or on-row compartment 31 seed level sensors 89 and seed-level sensors 91 at the bottom of the funnel 47a of the row unit reservoir 47. Referring again to FIG. 7, planter controller 93 evaluates signals from the seed level sensors 89,91 and communicates with the tractor controller 95 to determine a charging strategy and control strategy for the seed meters 35 (FIG. 2). The planter controller 93 commands selective delivery of the respective seed types 17a, 17b, 17c, 17d to identified target compartment(s) 31 (FIG. 2) of the on-row storage system 27 to achieve multi-seed-type planting according to the prescription map PM (FIG. 17). The control system 87 can do this by using the planter controller 63 to control the central bulk fill fluted roll motors 39a, row unit seed gate actuators 53a, mini-hopper compartment seed gate actuators 55a, and mini-hopper roll motors 41a to control rotation or other actuation movement of the rollers 39, row gates 53, compartment seed gates 55, and rollers 39 (FIG. 2), respectively. Referring again to FIG. 7, the planter controller 93 controls baffle actuator 111, singulator actuator 113, drive motor 36a, and vacuum control mechanism or motor 115 to control actuation, rotation, or other movement or performance characteristics of the baffle, singulator, rotational speed of seed disk 36 (FIG. 2), and vacuum pressure of the seed meter(s) 35. Planter controller 93 controls the belt drive 79 to increase or decrease the rotational speed of the upper pulley 77 for adjusting seed delivery speed from the speed tube 57. Planter controller 93 commands the adjustment of rotational speed of the upper pulley and thus adjustment of seed delivery speed based on the travel speed of the planter, which may be determined by the control system 87 through the monitoring of travel speed of tractor 9, to target a seed delivery speed out of speed tube 57 while monitoring seed delivery speed-based signals from the seed sensors 92 to match the travel speed of planter 7 and tractor 9. By matching the seed delivery speed of seeds 17 released from the speed control system 15 to the travel speed of planter 7 and tractor 9, the forward and rearward speeds cancel each other out and the seeds 17 fall from the speed control system 15 straight down such as along a seed drop path that is substantially vertical only with respect to a seed trench of the agricultural field.

To use the system 5, an operator first displays the seed type or variety prescription map PM (FIG. 19) on the computer display or monitor of the tractor interface system 105, which would typically be inside the tractor cab. The prescription map PM displays which seed types 17a, 17b, 17c are to be planted and where, corresponding to the type or variety zones VZ1, VZ2, VZ3. The operator inputs which seed types 17a, 17b, 17c are stored in compartments 23 of the bulk storage system 19 through the tractor interface system 105. The prescription map PM may also contain the seed population that is to be planted for each type or types 17a, 17b, 17c. The seed population could also be varied within the field based on soil type, organic matter, etc. The size of the seeds can also be input into the tractor interface system 75. This information could also be made available in the database that is built from the desktop software when the prescription map PM was created. Knowing the seed size will allow the control system 87 to control seed meter 35 settings such as vacuum, seed pool level, baffle, and singulator to ensure proper metering of individual seeds 17. Preferred settings for the seed meter 35 could also be preset by the operator and based on historical data or data provided by the seed 17 or planter 7 manufacturer. Adjustment of the seed meter 35 to obtain the preferred settings can be done by adjusting the vacuum setting for each meter 35 manually or automatically controlled from inside the tractor cab through the tractor interface system 105. Similarly, the seed singulator and baffle can be controlled manually or automatically through the control system 87 for each row unit 13, which may include making the actual physical adjustment(s) to the singulator and/or baffle. In one embodiment, an electrical solenoid or step motor attached to the singulator and/or baffle is controllable to make such adjustments.

Figure 8:
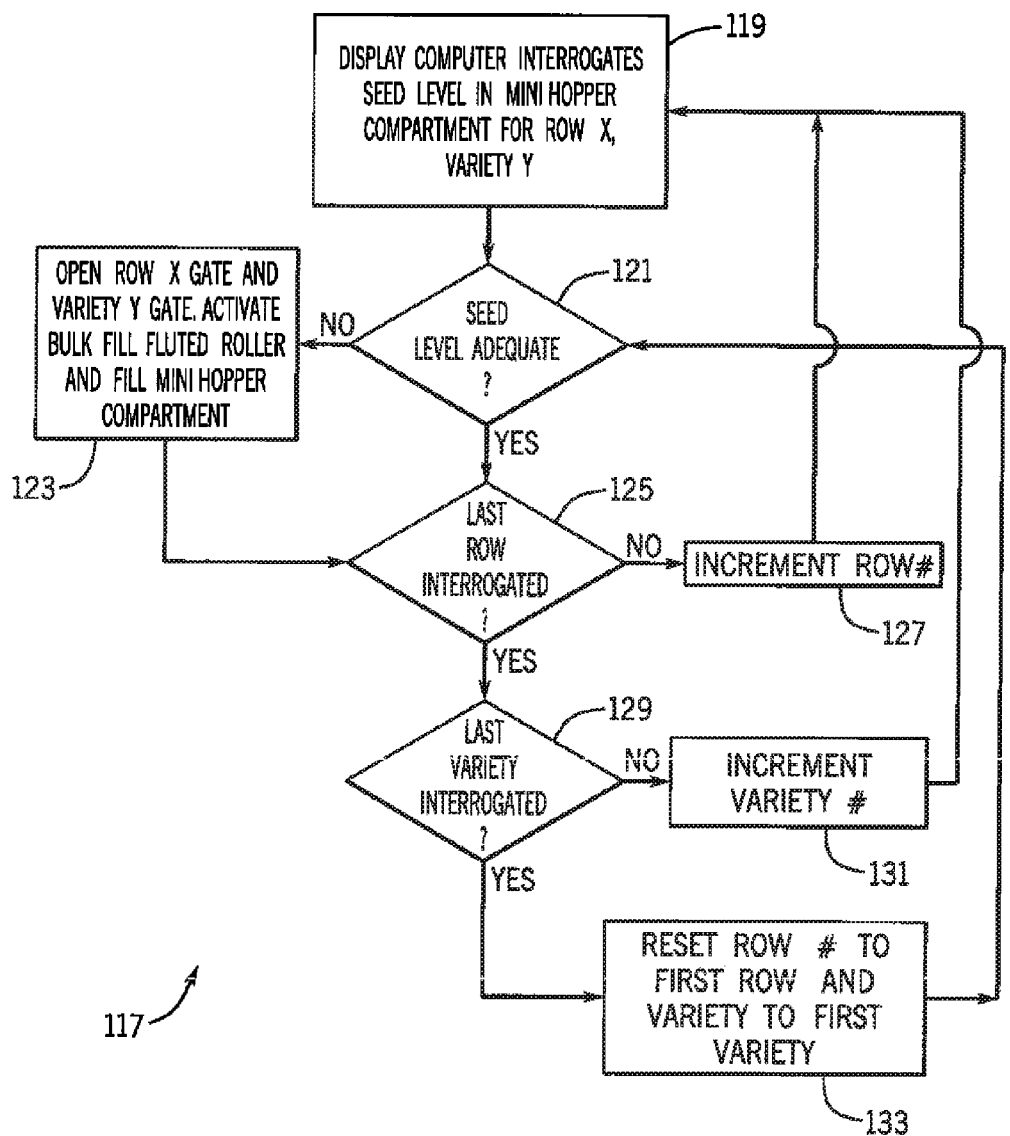
FIG. 8 is a flowchart showing a method for charging the on-row seed storage system.

Referring again to FIGS. 2-4, when the system 5 is first started, the control system 87 determines seed level in each of the compartments 31 of the on-row storage system 27 based on a signal(s) from the seeds level sensors 89 in the compartments 31. FIG. 8 shows a flowchart of an exemplary method 117 of charging the on-row storage system 27 by filling the compartments 31 with seed types 17a, 17b, 17c, 17d from the bulk storage system 19.

Referring still to FIG. 8 and with further reference to FIGS. 2-4, as represented at block 119, the control system 87 interrogates the seeds level sensors 89 of the compartments 31 of the on-row storage system 27, which may be done sequentially. As an initial step, as represented at block 121, the control system 87 interrogates the seeds level sensors 89 in compartment 31A of row 1. If it is empty or below a certain level, the control system 87 sends a signal to the planter controller 93 which powers the motor (not shown) that rotates the roller 39 at the outlet of the compartment 23 located at a base of the bulk fill hopper 21 of the bulk storage system 19. Rotating the roller 39 dispenses seed 17 of the seed type 17a into the main frame seed conduit or primary seed feeding line 43. Since the volume of seed in compartment 31 is known, the roller 39 for the compartment 23 of the bulk storage system 19 is calibrated to meter out only the exact quantity of seed that is required to fill the compartment 31a of the on-row storage system 27 of the particular row unit 13 for the row being filled with a seed variety at that particular time. The seed 17 is conveyed along the primary seed feeding line(s) 43 by way of airflow produced by the fan F. As represented at block 123, a row gate 53 is activated to seed 17 toward one of the row units 13. For example, when the seed 17 arrives at a junction between the primary seed feeding line(s) 43 and the secondary seed feeding line(s) 45 for the "Row 1" row unit 13 (FIG. 2), the gate 53 of the first gate system 49 at this junction is activated and directs flow of air and seed 17 through the row-unit seed conduit or secondary seed feeding line 45 toward the compartments 31 of the on-row storage system 27. Also as represented at block 123, when the seed 17 arrives at the junction between the secondary seed feeding line(s) 45 and the compartments 31 of the on-row storage system 27, a first one of the compartment seed gates 55 of the second seed gate system 51 is opened by the control system 57 to direct the flow of seed 17 and air into the associated compartment 31, in this case compartment 31a, for storing seed type 17a. The seed 17 drops into the compartment 31a and the air is allowed to escape through a perforated lid (not shown) that covers the mini-hopper(s) 33. After the seed 17 is delivered to the row 1 mini-hopper 33 and the seed level sensor 89 for compartment 31a of row 1 has confirmed that the proper amount of seed 17 has been delivered, the seeds level sensor 89 for the compartment holding seed type 17a on row 2 is interrogated. Optionally, a time delay could be put in place to trigger the interrogation of row 2. If seed 17 is required for that compartment, the seed is delivered to compartment 31a on the "Row 2" row unit 13 by actuating the seed gates 53, 55 to direct the seed 17 into compartment 31a on the "Row 2" row unit 13. The actuated positions of the seed gates 53, 55 to achieve this are shown in FIG. 3. As represented at blocks 125, 127, this sequence is repeated for all of the rows of the planter 7 until the type 17a compartments 31 on the mini-hoppers 33 have been completely filled or the seed level sensors 89 indicate that they are already full for all rows. As represented at blocks 129, 131, once the type 17a compartments 31 are full, the sequence is repeated for type 17b on all of the row units 13. FIG. 4 shows the end of the sequence for row 2 and shows type 17d being delivered from the bulk storage system 19 to the compartment 31d of the mini-hopper 33 on row 2. As represented at block 133, once the type 17d compartments 31d have been completely filled for all rows, the entire sequence starts over by interrogating the seed level sensors 89 for the type 17a compartment 31a on row 1. The entire sequence or process 87 is repeated as long as planting continues. The charging process does not necessarily have to be performed in the order that has been previously described. Control system 87 can control the charging process to achieve prioritized filling of on-row hoppers by most immediate need/lowest level based on sensor measurement or the prescription map PM (FIG. 19). In this way, fill level in the multiple compartments 31 of the on-row storage system 27 can be maintained by a prioritized charging during which an order of filling the multiple compartments 31 is performed according to an immediate need based on at least one of a detected lowest level of seeds 17 within the multiple compartments 31 and a location of the agricultural implement according to the prescription map PM of the agricultural field. Therefore, since the seeds level sensors 89 in the mini-hoppers 33 can sense seed level, the algorithm for determining which seed type(s) 17a, 17b, 17c, 17d should be dispensed and to which row could be determined by, for example, which compartment 31 has the lowest level of seed 17. An additional algorithm could use the seed type or variety prescription map PM (FIG. 19) and look ahead to see which type 17a, 17b, 17c, 17d is predominantly going to be planted and adjust the refilling sequence accordingly. When the entire charging process 117 is completed, the tractor interface system 105 display could signal to the operator that planting can begin.

Referring again to FIG. 7 and with further reference to FIG. 2, by way of the tractor GPS 109 communicating with tractor controller 95, the control system 87 is able to determine which seed types 17a, 17b, 17c, 17d are to be planted by each of the planter row units 13 based on the prescription map PM (FIG. 19) and thus the VZ1, VZ2, VZ3, VZ4. For example, if type 17a is to be planted on row 1, the control system 87 activates an electric motor (not shown) that is connected to and rotates the roller 41 at the outlet of the compartment 31a storing type 17a on row 1 (FIG. 2). The seed 17 is dispensed into the row unit reservoir 47 that directs the seed toward the seed disk 36. Control system 87 can command rotation of rollers 41 so that a predetermined batch size is released, such as approximately 50 seeds metered out at the compartment 31A outlet at a time. When the seed-level sensors 91 at the bottom of the funnel 47a of the row unit reservoir 47 determines more seed 17 is required, the control system 87 determines if row 1 is still required to plant seed type 17a. If it is, then the motor for the roller 41 at the outlet of the compartment 31a storing seed type 17a is again activated and more seeds 17 of type 17a are dispensed into the row unit reservoir 47. If the prescription map PM indicates that seed type 17b is required, the motor for roller 41 of compartment 31b is activated and seed 17 of type 17b is dispensed into the row unit reservoir 47. This process continues as long as the planting operation continues. The same process is used for all of the rows on the planter 7. There is no requirement that all rows must be planting the same type(s) 17a, 17b, 17c, 17d. In one embodiment, each row unit 13 could be planting a different type 17a, 17b, 17c, 17d at different rows at the same time and any individual row could switch from one variety to the other as called for by the seed variety prescription map PM. It is understood that one or more of the zones VZ1, VZ2, VZ3, VZ4 can require a predetermined mixture of two or more of the seed types 17a, 17b, 17c, 17d, whereby the control system 57 controls release of seeds 17 from the bulk and/or on-row storage systems 19, 27 to create a purposeful mixture based on the desired predetermined mixture ratio. The mixing can be done at the charging stage. In this way, the seed types 17a, 17b, 17c, 17d of a zone-required mixture can be simultaneously or otherwise delivered from respective compartments 23 of bulk storage system 19 into a single compartment(s) 31 of the on-row storage system 27, such that the compartment(s) 31 stores the mixture in the on-row storage system 27. The mixing can also be done at the meter feeding stage. In this way, mixing occurs while filling the seed pool(s). This can be done by releasing seeds of multiple types 17a, 17b, 17c, 17d from multiple compartments 31 of the on-row storage system 27 to provide a seed pool having a mixture of the different types of seeds 17a, 17b, 17c, 17d within a seed meter(s) 35. Regardless of where the mixing occurs relative the bulk storage or on-row storage and seed metering systems 19, 27, 29, control system 57 controls release of seeds 17 to provide various mixtures required by a zone-required mixtures such as, for example, a mixture of 25% seed type 17a and 25% seed type 17c, and 50% seed type 17d, by controlled mixing while feeding the seed pool or upstream.

In an embodiment in which different seed populations for the seed types 17a, 17b, 17c, 17d are known for the variety zones, the control system 87 controls the seed meters 35 to achieve the target seed populations. This may be done by manually or automatically adjusting at least one of a seed disk rotational speed for adjusting seed population, a seed singulator setting, vacuum level, baffle position, and/or seed depth inside the seed meter reservoir. Corresponding adjustments can also be made to accommodate different seed type, size or shape, or the varieties, of seed types 17a, 17b, 17c, 17d. Control system 87 can control the seed delivery speed control system 15 to release seeds 17 to achieve the predetermined known seed populations for the seed types 17a, 17b, 17c, 17d for the variety zones VZ1, VZ2, VZ3, VZ4. Control system 87 does this by adjusting the seed delivery speed to achieve the release rate as a function of travel speed of the planter 7 to provide the spacing distance between adjacent seeds 7 in the same seed trench corresponding to a target spacing value that provides the target seat population for the particular seed type(s) 17a, 17b, 17c, 17d.

Figure 9:
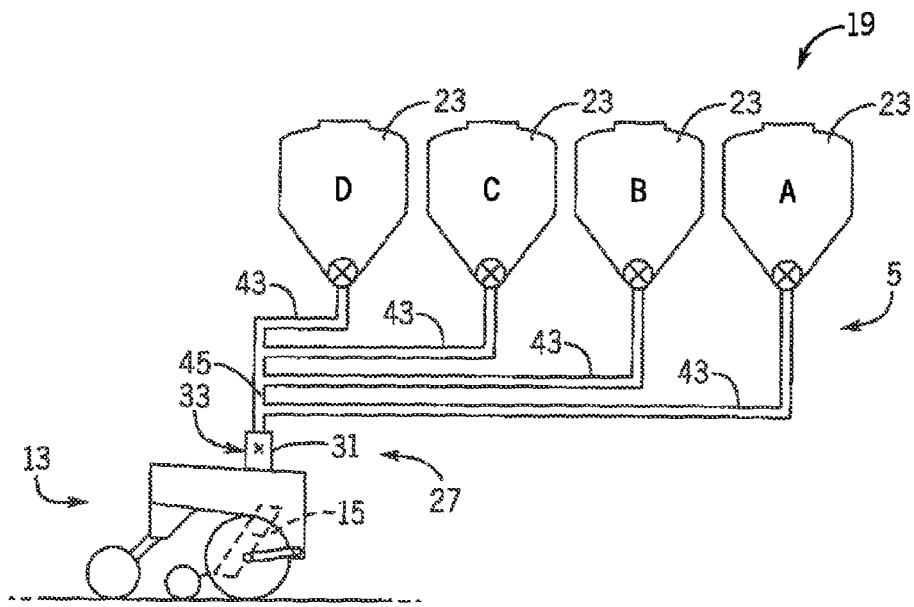
FIG. 9 is another simplified schematic representation of a planting system for planting multiple varieties of seed.
Figure 10:
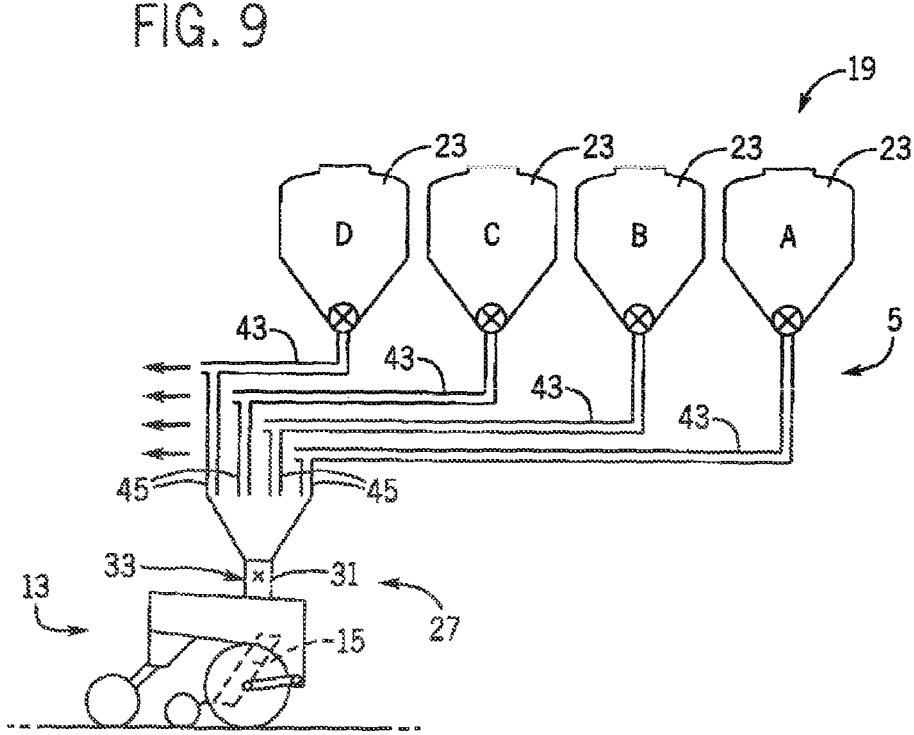
FIG. 10 is another simplified schematic representation of a planting system for planting multiple varieties of seed.
Figure 11:
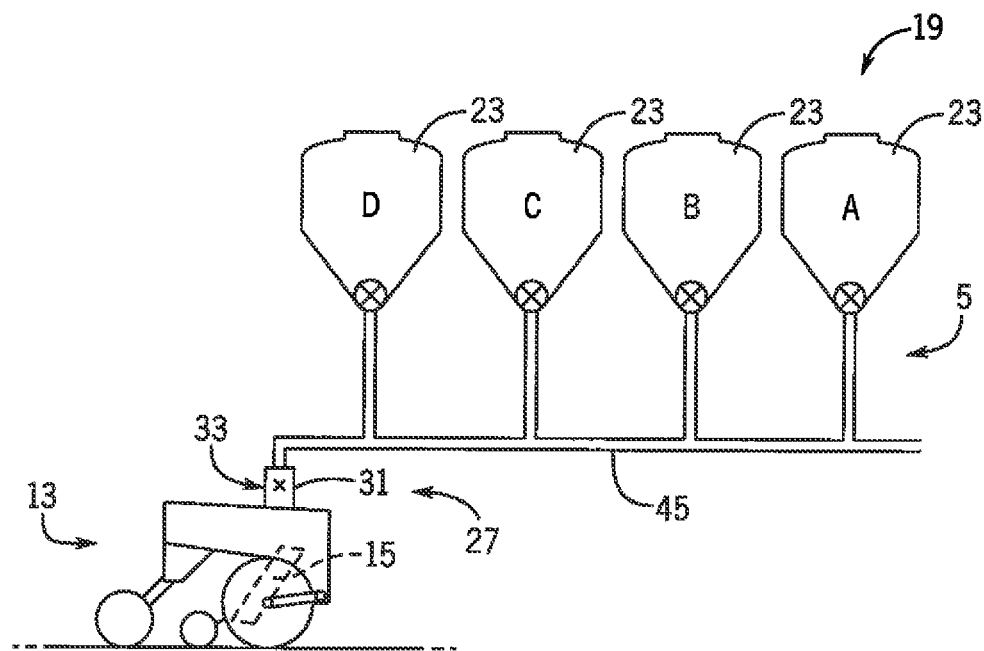
FIG. 11 is another simplified schematic representation of a planting system for planting multiple varieties of seed.
Figure 12:
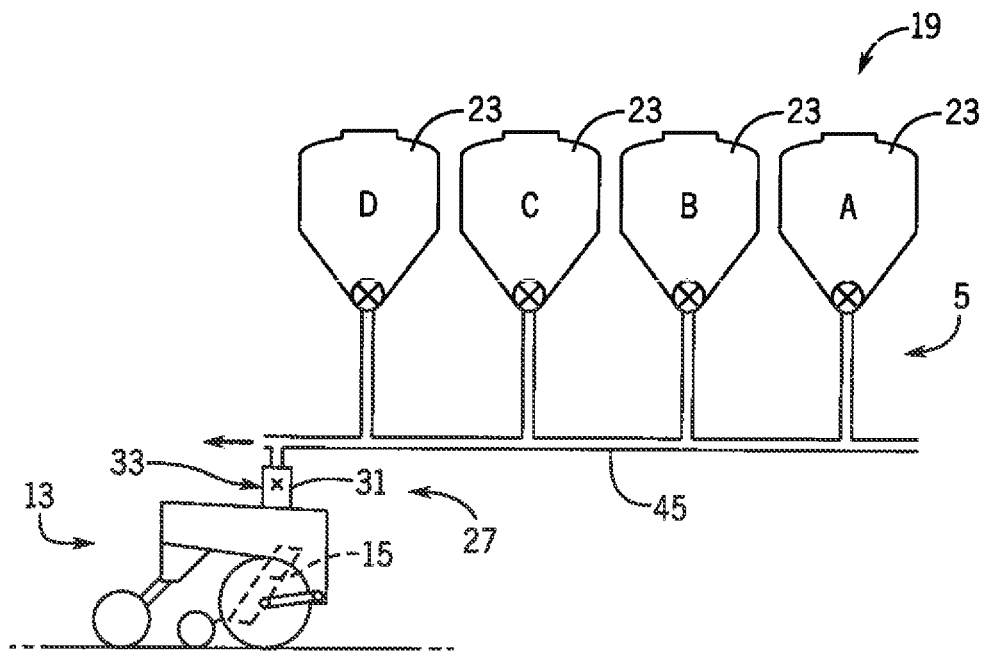
FIG. 12 is another simplified schematic representation of a planting system for planting multiple varieties of seed.
Figure 13:
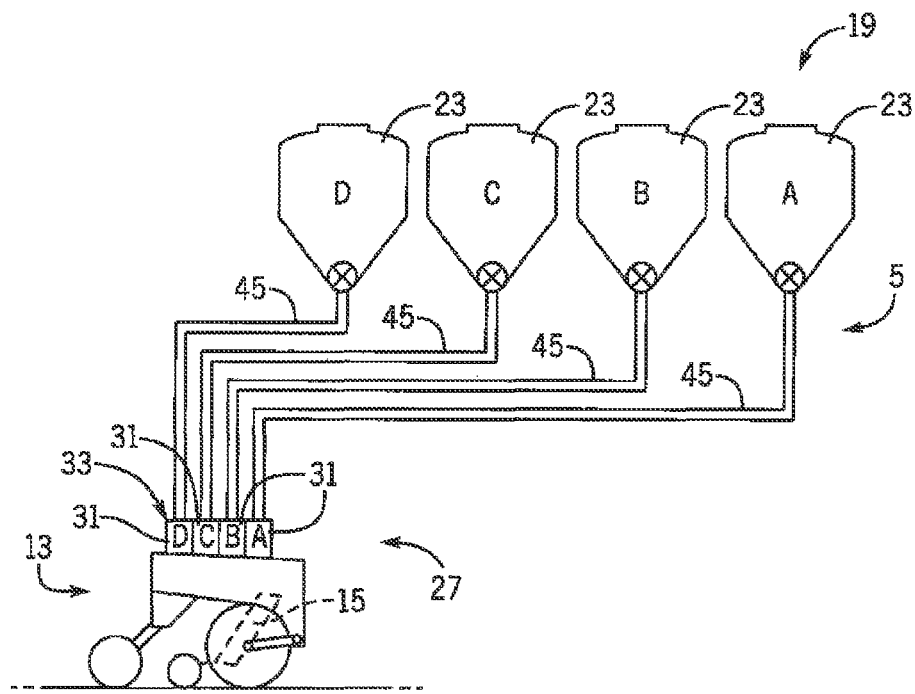
FIG. 13 is another simplified schematic representation of a planting system for planting multiple varieties of seed.
Figure 14:
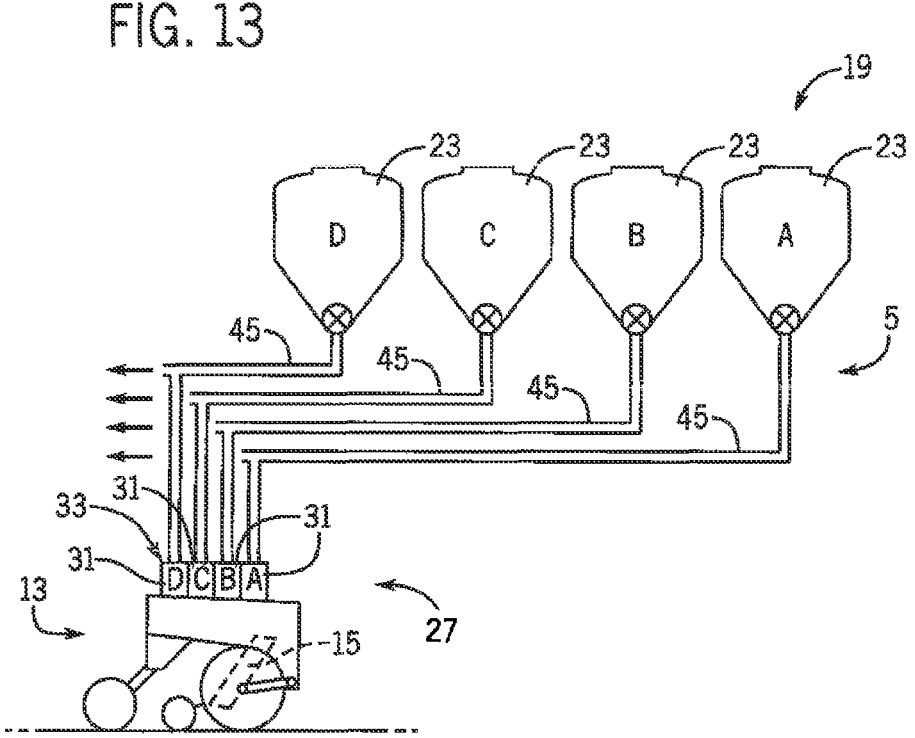
FIG. 14 is another simplified schematic representation of a planting system for planting multiple varieties of seed.
Figure 15:
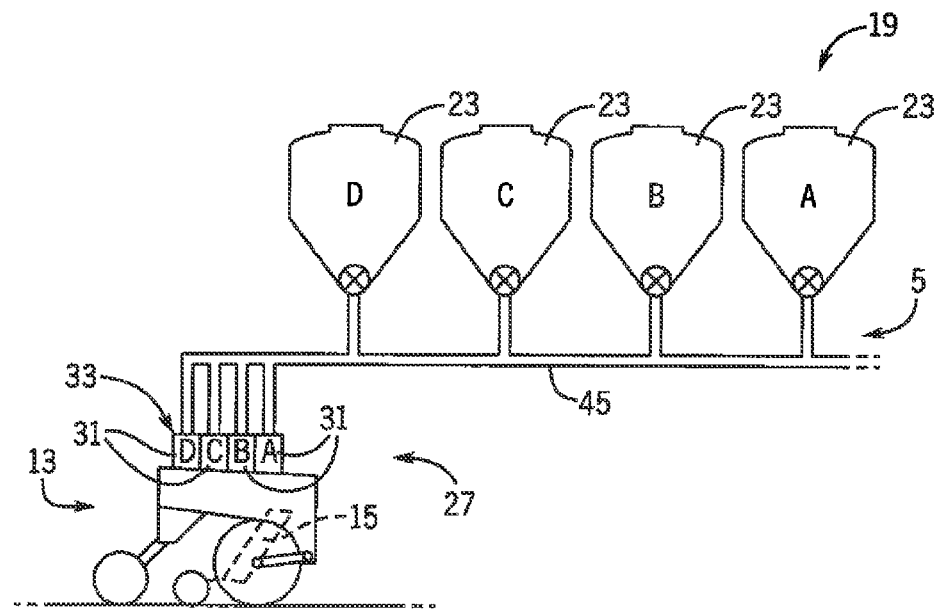
FIG. 15 is another simplified schematic representation of a planting system for planting multiple varieties of seed.
Figure 16:
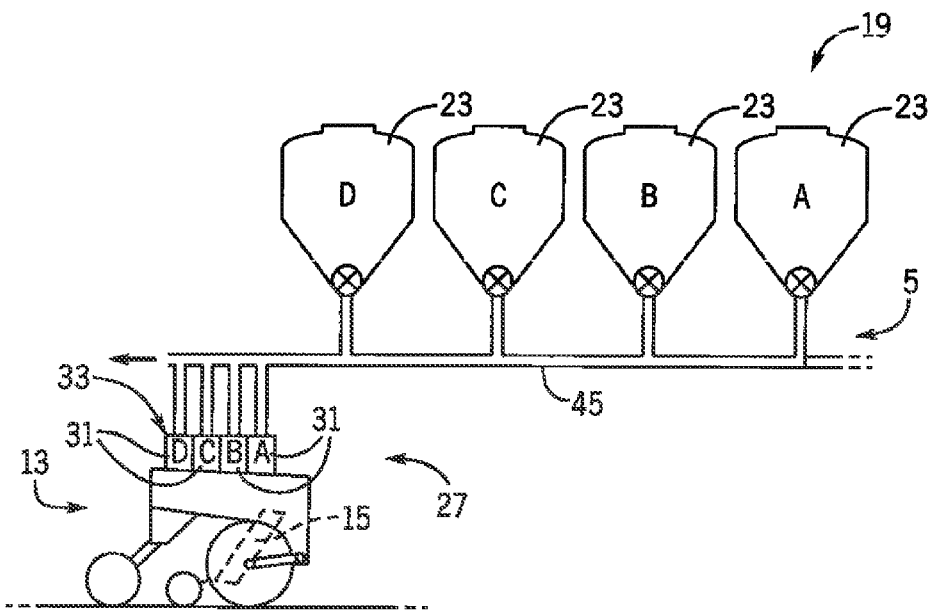
FIG. 16 is another simplified schematic representation of a planting system for planting multiple varieties of seed.

FIG. 9-16 shows variations of the system 5 of FIGS. 1-4. The variations are labeled with configuration numbers and schematically show combinations of different numbers of compartments 31 of the on-row storage system 27, different numbers of seed conduits or feed lines, and corresponding arrangements of the seed lines and compartments. FIG. 17 provides a chart with summary information of the variations of the system 5, such as those shown in FIGS. 9-16. FIG. 9 and cell 135 of FIG. 17 show an individual line for each variety for each row, with a single compartment 31 of the on-row storage system 27 at each row unit 13. This is shown in FIG. 9 as a primary seed feeding line 43 from each one of the compartments 23 of the bulk storage system 19 connecting to a single secondary seed feeding line 45 that is connected to a single compartment 31 of the on-row storage system 27. FIG. 10 and cell 137 of FIG. 17 show a single line for each variety feeding multiple rows, with a single compartment 31 of the on-row storage system 27 at each row unit 13. This is shown in FIG. 7 as a primary seed feeding line 43 from each one of the compartments 23 of the bulk storage system 19 connecting to separate secondary seed feeding lines 45 that connect to a single compartment 31 of the on-row storage system 27, with each primary seed feeding line 43 extending past the respective secondary seed feeding line 45 to the subsequent row units 13. FIG. 11 and cell 139 of FIG. 17 show a single line for each row feeding all varieties, with a single compartment 31 of the on-row storage system 27 at each row unit 13. This is shown in FIG. 9 as a single primary seed feeding line 43 connected to all of the compartments 23 of the bulk storage system 19 and terminating at a single compartment 31 of the on-row storage system 27. FIG. 12 and cell 141 of FIG. 17 show a single line feeding all varieties for all rows, with a single compartment 31 of the on-row storage system 27 at each row unit 13. This is shown in FIG. 9 as a single primary seed feeding line 43 connected to all of the compartments 23 of the bulk storage system 19, connected to a single compartment 31 of the on-row storage system 27 and extending past the respective single compartment 31 of the on-row storage system 27 to the subsequent row units 13. FIG. 13 and cell 143 of FIG. 17 show an individual line for each variety for each row, with multiple compartments 31 of the on-row storage system 27 at each row unit 13. This is shown in FIG. 13 as a primary seed feeding line 43 from each one of the compartments 23 of the bulk storage system 19 connected to a single respective one of the compartments 31 of the on-row storage system 27. FIG. 14 and cell 145 of FIG. 17 show a single line for each variety feeding multiple rows, with multiple compartments 31 of the on-row storage system 27 at each row unit 13. This is shown in FIG. 14 as a primary seed feeding line 43 from each one of the compartments 23 of the bulk storage system 19 connecting to separate secondary seed feeding lines 45 that connect to respective compartments 31 of the on-row storage system 27, with each primary seed feeding line 43 extending past the respective secondary seed feeding line 45 to the subsequent row units 13. FIG. 15 and cell 147 of FIG. 17 show a single line for each row feeding all varieties, with multiple compartments 31 of the on-row storage system 27 at each row unit 13. This is shown in FIG. 15 as a single primary seed feeding line 43 connected to all of the compartments 23 of the bulk storage system 19 and terminating at the row unit 13 while connecting to each of the compartments 31 of the on-row storage system 27. FIG. 16 and cell 149 of FIG. 17 show a single line feeding all varieties for all rows, with multiple compartments 31 of the on-row storage system 27 at each row unit 13. This is shown in FIG. 16 as a single primary seed feeding line 43 connected to all of the compartments 23 of the bulk storage system 19, connected to each of the compartments 31 of the on-row storage system 27, and extending past the respective single compartment 31 of the on-row storage system 27 to the subsequent row units 13. Referring now to FIG. 17, cells 135, 137, 139, 141, 143, 145, 147, 149 represent a planter 7 (FIG. 1) with a single seed meter 35 at each row unit 13, whereas cells 151, 153, 155, 157 of FIG. 17 represent a planter 7 with multiple seed meters 35 at each row unit 13, such as twin-row planters. Regardless of the particular configuration of the planter 7, it is understood that the variations of system 5 represented in FIGS. 9-16 may include the charging system 37 (FIG. 2) or respective components such as the intersections of various planter components to achieve the selective charging.

In an embodiment in which row by row multi-variety control is not required, and/or in which a 100% switchover within a relatively short distance is not required, the compartments 31 and rollers 41 of the mini-hoppers 33 can be eliminated.

In one embodiment, the system 5 is incorporated with a non-bulk fill planter 7 equipped with row mounted seed hoppers as long as each row hopper is partitioned and is able to gravity feed into the seed meter reservoirs. This embodiment does not require a central bulk fill hopper(s) 21 or charging system 37, but may instead include a partitioned on-row hopper or multiple on-row hoppers as the compartments 31 to gravity feed into the row unit reservoir 47 or internal reservoir of the seed meter 35.

Figure 18:
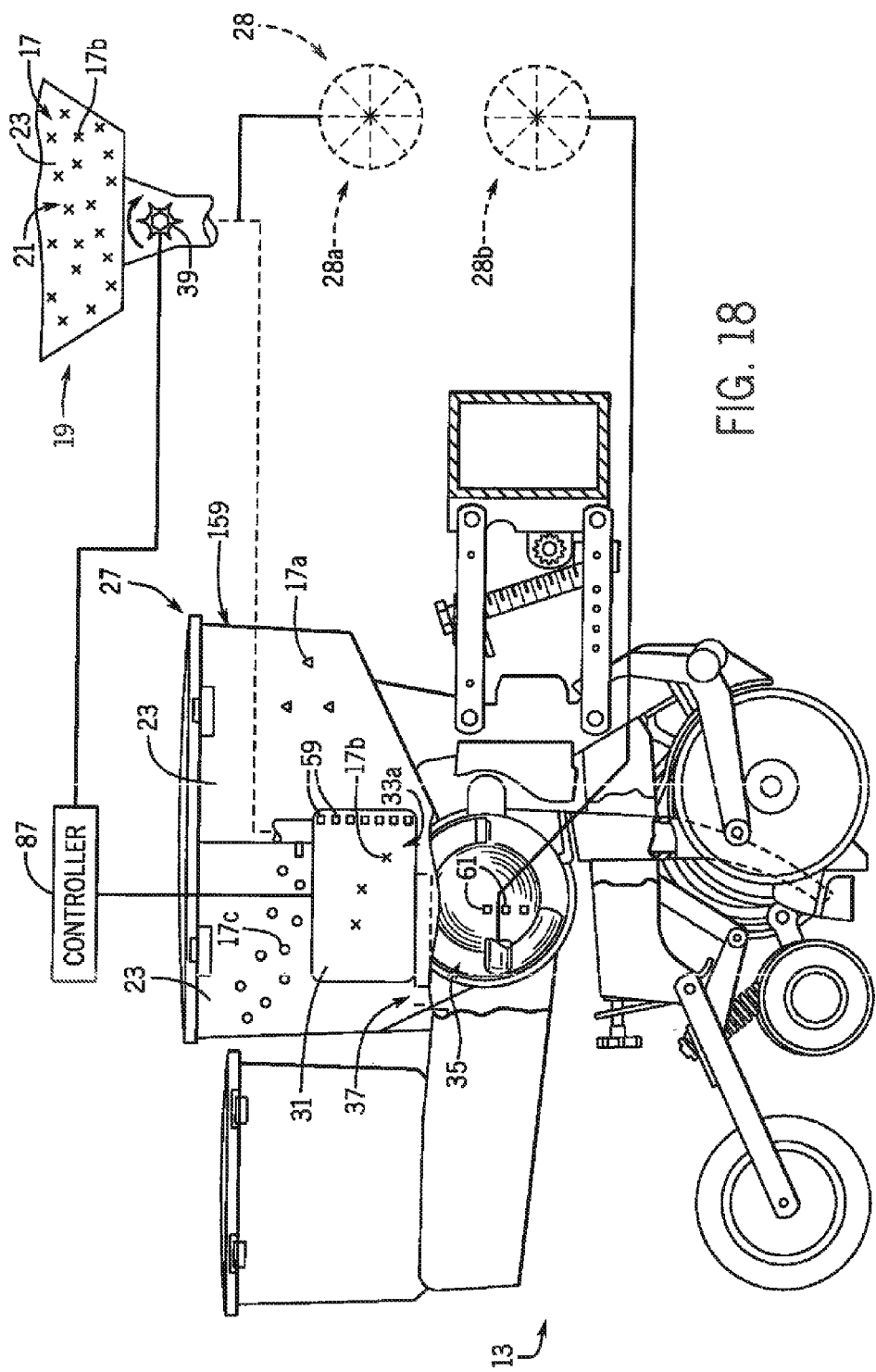
FIG. 18 is another simplified schematic representation of a planting system for planting multiple varieties of seed.

Referring now to FIG. 18, in this embodiment, the system 5 includes a combination of central bulk fill hopper(s) 21 of a bulk storage system 19 feeding a mini-hopper 33*a* as one compartment 31 at each row unit 13, with seed type 17*b* stored in bulk remotely from the row unit 13. Seed types 17*a*, 17*c* are stored in bulk on the row itself, in a partitioned on-row hopper 159 of the on-row storage system 27 or multiple on-row hoppers on each row unit 13. Charging system 37 is arranged to selectively deliver seeds of the various types 17*a*, 17*b*, 17*c* to the seed meter 35, such as by way of rollers 41 (FIG. 2) arranged between the compartments 23, 31 of the on-row hopper 159 and mini-hopper and the seed meter 35. The mini-hopper 33*a*, would be fed from a bulk fill hopper(s) 21 of the bulk storage system 19 as previously explained. The on-row hopper 159 could be used to hold the varieties of seed 17 that would be less frequently used in its compartments 23. The mini-hopper 33*a* fed from the bulk fill hopper(s) 21 could be used for the seed 17 that will be planted on a majority of the field. This configuration eliminates partitions and separate compartments 23 of the remote, centrally located bulk fill hopper(s) 21, and may reduce the number of seed conduits or feed lines, gates, and rollers, as compared to the previously described charging system 37.

Many changes and modifications could be made to the invention without departing from the spirit thereof. Various components and features of the system 5, for example, components or features of the seed storage system(s), charging system(s), and seed metering system(s) can be incorporated alone or in different combinations on a planter. The scope of these changes will become apparent from the appended claims.

We claim:

1. A planter for planting seed of multiple seed types in a single planting pass during row-crop planting of an agricultural field and controlling seed delivery speed, the planter comprising:
   a frame supporting multiple row units;
   a seed storage system for separately storing seeds of multiple seed types on the planter, the seed storage system including at least one bulk storage system for separately storing the multiple types of seed, an on-row storage system with multiple on-row compartments for storing the multiple seed types at each row unit, and a seed feeding line operatively connecting the at least one bulk fill storage system with the on-row storage system so as to allow a selected one of the multiple types of seeds to be transported to a selected one of the multiple on-row compartments wherein each of the on-row compartments has an outlet that is configured to selectively release seeds from the respective on-row compartment in a downstream direction;
   a seed-metering system at each of the multiple row units, the seed metering system including an input for selectively receiving the seeds of the multiple seed types from each of the outlets of the on-row compartments of the on-row seed storage system and an outlet; and
   a seed delivery speed control system receiving the seeds from the outlet of seed-metering system and releasing the seeds for planting of an agricultural field, wherein the seed delivery speed control system adjusts a delivery speed of the seeds based on at least one of a travel speed of the planter and a target spacing distance corresponding to the one of the multiple seed types delivered from the seed-metering system to the seed delivery speed control system.

2. The planter of claim 1 wherein the seed delivery speed control system includes a seed delivery speed control device extending away from an outlet of the seed meter to direct the seeds toward a seed trench in the agricultural field.

3. The planter of claim 2 wherein the seed delivery speed control device comprises a speed tube with an upper end receiving the seeds from the seed meter and a lower end extending away from an outlet of the seed meter to direct the seeds toward a seed trench in the agricultural field.

4. The planter of claim 3 wherein the speed tube includes a belt configured to rotate at a variable speed for adjusting delivery speed of the seeds released from the speed tube.

5. The planter of claim 1 wherein the seed delivery speed control system is configured to adjust the delivery speed of the seeds to approximate a detected travel speed of the planter with the seeds delivered in a delivery direction that is opposite a travel direction of the planter to provide a seed drop path that is substantially vertical-only with respect to a seed trench of the agricultural field.

6. The planter of claim 1 wherein the seed delivery speed control system is configured to adjust the delivery speed of the seeds to approximate a target spacing between adjacent seeds in a common seed trench based on a predetermined target seed population for a corresponding one of the multiple seed types of seeds being released when the adjustment is made.

7. The planter of claim 1 wherein the seed delivery speed control system includes at least one sensor arranged for detecting delivery speed of the seeds.

8. The planter of claim 7 wherein the seed delivery speed control system includes a pair of spaced apart sensors arranged for detecting movement of a seed past each of the sensors for determining detecting speed of the seeds delivered from the seed delivery speed control system.

9. The planter of claim 8 wherein the pair of spaced apart sensors is arranged relative to a discharge tube of the seed delivery speed control system for detecting movement of each seed through the discharge tube.

10. The planter of claim 1 further comprising a charging system configured to selectively deliver seeds of the multiple seed types to the seed meter, wherein the charging system is arranged upstream of the seed meter and the seed delivery speed control system is arranged downstream of the seed meter.

11. The planter of claim 1 wherein the bulk storage system includes a plurality of compartments configured for separately storing seeds of at least some of the multiple seed types on the planter at a remote location relative to the multiple row units.

12. The planter of claim 1 further comprising a diverter system arranged between the at least one bulk storage system and seed feeding tube and being configured to selectively divert one of the multiple types of seeds from the at least one bulk fill storage system to the seed feeding line.

13. The planter of claim 1 wherein the diverter system arranged between the seed feeding tube and the on-row storage system, the diverter system including a gate system with gates configured to actuate for defining the passages between the seed feeding tube and the on-row storage system to direct seeds of the multiple seed types into corresponding ones of multiple compartments of the on-row storage system.

14. A planter for planting seed of multiple seed types in a single planting pass during row-crop planting of an agricultural field and controlling seed delivery speed, the planter comprising:
   a frame supporting multiple row units;
   a seed storage system for separately storing seeds of multiple seed types on the planter, wherein the seed storage system including at least one bulk storage system for separately storing the multiple types of seed and an on-row storage system with multiple on-row compartments for storing the multiple seed types at each row unit and wherein each of the on-row compartments has an outlet that is configured to selectively release seeds from the respective on-row compartment in a downstream direction;
   a seed-metering system at each of the multiple row units, the seed-metering system including an input for selectively receiving the seeds of the multiple seed types from each of the outlets of the on-row compartments of the on-row seed storage system and an outlet; and
   a speed tube receiving the seeds from the seed-metering system and releasing the seeds for planting of an agricultural field, the speed tube having a conveyance mechanism configured to move at an adjustable speed to vary the delivery speed of the seeds.

15. The planter of claim 14 wherein the conveyance mechanism is a belt rotated by a belt drive at a variable speed to adjust the delivery speed of the seeds based on at least one of a travel speed of the planter and a target spacing distance corresponding to the one of the multiple seed types delivered from the seed-metering system to the seed delivery speed control system.

16. The planter of claim 15 wherein the seed storage system includes a seed feeding line operatively connecting the at least one bulk fill storage system with the on-row storage system so as to allow a selected one of the multiple types of seeds to be transported to a selected one of the multiple on-row compartments.

17. A method of planting seed of multiple seed types in a single planting pass during row-crop planting of an agricultural field and controlling seed delivery speed, the method comprising:
   separately storing seeds of multiple seed types in at least one bulk storage system on a planter having multiple row units,
   selectively delivering each of the multiple, types of seeds in the at least one bulk storage system to a corresponding compartment of multiple on-row compartments at each of the multiple row units for storage;
   selectively delivering seeds of the multiple seed types from the multiple on-row compartments to an input of a seed-metering system at each of the multiple row units;
   singulating the seeds in the seed-metering system;
   delivering the singulated seeds from an output of the seed-metering system to a seed delivery speed control system releasing the singulated seeds to a seed trench of the agricultural field; and
   adjusting a delivery speed of the seeds released from the seed delivery speed control system based on at least one of a travel speed of the planter and a target spacing distance corresponding to the one of the multiple seed types being released from the seed delivery speed control system.

* * * * *